(12) United States Patent
Kremesec et al.

(10) Patent No.: US 12,120,973 B2
(45) Date of Patent: Oct. 22, 2024

(54) CROP DETECTION SYSTEM AND/OR METHOD

(71) Applicant: FarmWise Labs, Inc., Santa Clara, CA (US)

(72) Inventors: Garrick Kremesec, Santa Clara, CA (US); Thomas Palomares, Santa Clara, CA (US); Christian Carlberg, Santa Clara, CA (US); Oswaldo Torres, Santa Clara, CA (US)

(73) Assignee: FarmWise Labs, Inc., Santa Clara, CA (US)

(*) Notice: Subject to any disclaimer, the term of this patent is extended or adjusted under 35 U.S.C. 154(b) by 0 days.

(21) Appl. No.: 18/435,730

(22) Filed: Feb. 7, 2024

(65) Prior Publication Data

US 2024/0260499 A1 Aug. 8, 2024

Related U.S. Application Data

(60) Provisional application No. 63/468,111, filed on May 22, 2023, provisional application No. 63/443,936, filed on Feb. 7, 2023.

(51) Int. Cl.
*A01B 79/00* (2006.01)
*A01B 69/04* (2006.01)
(Continued)

(52) U.S. Cl.
CPC .......... *A01B 79/005* (2013.01); *A01B 69/008* (2013.01); *G06T 7/60* (2013.01);
(Continued)

(58) Field of Classification Search
CPC ... A01B 69/008; A01B 79/005; A01C 23/047; A01M 7/0089; A01M 21/043;
(Continued)

(56) References Cited

U.S. PATENT DOCUMENTS

| 4,182,101 A | 1/1980 | Gaeddert et al. |
| 4,413,685 A | 11/1983 | Gremelspacher et al. |

(Continued)

FOREIGN PATENT DOCUMENTS

| AU | 2013295763 B2 | 10/2017 |
| AU | 2018216246 B2 | 8/2022 |

(Continued)

OTHER PUBLICATIONS

"Precision Farming", Novalto, Oct. 13, 2001.
Kremesec, Garrick, et al., "Automated Agriculture Implement", U.S. Appl. No. 18/435,924, filed Feb. 7, 2024.

*Primary Examiner* — Daniel G Mariam
(74) *Attorney, Agent, or Firm* — Jeffrey Schox; Diana Lin

(57) ABSTRACT

A system for crop detection and/or analysis can include a set of sensors; a plurality of Light-Emitting Diodes (LEDs); a computing system; a housing; and a set of thermal components. Additionally or alternatively, the system can include any other suitable components. A method for crop detection and/or analysis can include any or all of: activating a set of lighting elements; collecting a set of images; and processing the set of images. Additionally or alternatively, the method can include any or all of: actuating and/or otherwise activating a set of implements; training and/or updating (e.g., retraining) a set of models used in processing the set of images; and/or any other suitable processes.

20 Claims, 20 Drawing Sheets
(17 of 20 Drawing Sheet(s) Filed in Color)

(51) Int. Cl.
  *G06T 7/60* (2017.01)
  *H04N 13/239* (2018.01)
  *H04N 13/254* (2018.01)
  *H04N 23/52* (2023.01)

(52) U.S. Cl.
  CPC ......... *H04N 13/239* (2018.05); *H04N 13/254* (2018.05); *H04N 23/52* (2023.01); *G06T 2207/10012* (2013.01); *G06T 2207/20081* (2013.01); *G06T 2207/30188* (2013.01)

(58) Field of Classification Search
  CPC .... H04N 13/239; H04N 13/254; H04N 23/52; G06T 7/60; G06T 2207/10012; G06T 2207/20081; G06T 2207/30188; G06V 20/188
  See application file for complete search history.

(56) References Cited

U.S. PATENT DOCUMENTS

| | | |
|---|---|---|
| 4,674,403 A | 6/1987 | Bryant et al. |
| 4,721,168 A | 1/1988 | Kinzenbaw |
| 4,868,752 A | 9/1989 | Fujii et al. |
| 5,272,859 A | 12/1993 | Pruitt et al. |
| D360,862 S | 8/1995 | McClain et al. |
| 5,442,552 A | 8/1995 | Slaughter et al. |
| 5,540,288 A | 7/1996 | Dietrich, Sr. |
| 5,625,776 A | 4/1997 | Johnson |
| 5,842,428 A | 12/1998 | Stufflebeam et al. |
| 5,884,464 A | 3/1999 | McMillen |
| 5,924,269 A | 7/1999 | McMillen |
| 5,946,896 A | 9/1999 | Daniels |
| 5,974,348 A | 10/1999 | Rocks |
| 6,109,193 A | 8/2000 | Crabb et al. |
| 6,442,485 B2 | 8/2002 | Evans |
| 6,523,333 B2 | 2/2003 | Metzger |
| 6,819,780 B2 | 11/2004 | Benson et al. |
| 7,032,369 B1 | 4/2006 | Eaton et al. |
| 7,272,713 B1 | 9/2007 | Tester |
| 7,606,739 B1 | 10/2009 | Johnson |
| 8,191,795 B2 | 6/2012 | Grimm et al. |
| 8,523,085 B2 | 9/2013 | Grimm et al. |
| 8,540,159 B2 | 9/2013 | Lee et al. |
| 8,606,503 B2 | 12/2013 | Rothschild |
| 9,030,549 B2 | 5/2015 | Redden |
| 9,064,173 B2 | 6/2015 | Redden |
| 9,119,388 B2 | 9/2015 | Jens |
| 9,144,189 B2 | 9/2015 | Stoller et al. |
| 9,265,187 B2 | 2/2016 | Cavender-Bares et al. |
| 9,288,937 B2 | 3/2016 | Sauder et al. |
| 9,288,938 B2 | 3/2016 | Cavender-Bares et al. |
| 9,332,689 B2 | 5/2016 | Baurer et al. |
| 9,339,023 B2 | 5/2016 | Ballu |
| 9,392,743 B2 | 7/2016 | Camacho-Cook et al. |
| 9,420,748 B2 | 8/2016 | Chan et al. |
| 9,578,799 B2 | 2/2017 | Allgaier et al. |
| 9,658,201 B2 | 5/2017 | Redden et al. |
| 9,717,171 B2 | 8/2017 | Redden et al. |
| 9,750,174 B2 | 9/2017 | Sauder et al. |
| 9,756,771 B2 | 9/2017 | Redden |
| 9,801,322 B2 | 10/2017 | Sauder et al. |
| 9,943,027 B2 | 4/2018 | Sauder et al. |
| 10,008,035 B1 | 6/2018 | Redden et al. |
| 10,098,273 B2 | 10/2018 | Redden et al. |
| 10,175,362 B2 | 1/2019 | Redden et al. |
| 10,219,431 B2 | 3/2019 | Stoller et al. |
| 10,219,449 B2 | 3/2019 | Redden |
| 10,231,376 B1 | 3/2019 | Stanhope et al. |
| 10,255,670 B1 | 4/2019 | Wu et al. |
| 10,262,413 B2 | 4/2019 | Strnad et al. |
| 10,278,333 B2 | 5/2019 | Shen et al. |
| 10,327,393 B2 | 6/2019 | Redden et al. |
| 10,390,481 B1 | 8/2019 | Brown et al. |
| 10,390,497 B2 | 8/2019 | Redden |
| 10,448,571 B1 | 10/2019 | McFarland et al. |
| 10,455,755 B2 | 10/2019 | Stanhope |
| 10,491,879 B2 | 11/2019 | Redden |
| 10,524,402 B2 | 1/2020 | Redden |
| 10,537,071 B2 | 1/2020 | Redden |
| 10,548,306 B2 | 2/2020 | Albert et al. |
| 10,617,071 B2 | 4/2020 | Redden et al. |
| 10,624,269 B1 | 4/2020 | Linde |
| 10,679,056 B2 | 6/2020 | Zemenchik |
| 10,681,861 B2 | 6/2020 | Morgan et al. |
| 10,681,862 B2 | 6/2020 | Stoller et al. |
| 10,681,871 B1 | 6/2020 | Fay |
| 10,681,905 B2 | 6/2020 | Tanner et al. |
| 10,703,277 B1 | 7/2020 | Schroeder |
| 10,713,484 B2 | 7/2020 | Polzounov et al. |
| 10,719,709 B2 | 7/2020 | Zemenchik |
| 10,761,211 B2 | 9/2020 | Redden et al. |
| 10,769,845 B2 | 9/2020 | Redden et al. |
| 10,785,905 B2 | 9/2020 | Stoller et al. |
| 10,806,074 B2 | 10/2020 | Zemenchik |
| 10,812,776 B2 | 10/2020 | Redden |
| 10,814,887 B1 | 10/2020 | Sutton |
| 10,845,810 B2 | 11/2020 | Flajolet et al. |
| D921,056 S | 6/2021 | Vallat |
| 11,030,804 B2 | 6/2021 | Redden et al. |
| 11,058,042 B2 | 7/2021 | Redden |
| 11,071,293 B2 | 7/2021 | Brown et al. |
| 11,071,991 B2 | 7/2021 | Serrat et al. |
| 11,085,156 B2 | 8/2021 | Serrat et al. |
| 11,093,745 B2 | 8/2021 | Redden et al. |
| 11,109,585 B2 | 9/2021 | Serrat et al. |
| 11,125,568 B2 | 9/2021 | Opitsch et al. |
| 11,129,343 B2 | 9/2021 | Redden et al. |
| 11,160,269 B2 | 11/2021 | Brown et al. |
| 11,178,809 B1 | 11/2021 | Brown et al. |
| 11,197,409 B2 | 12/2021 | Redden et al. |
| 11,237,563 B2 | 2/2022 | Javault et al. |
| 11,350,622 B2 | 6/2022 | Redden |
| 11,393,049 B2 | 7/2022 | Khait et al. |
| 11,553,636 B1 | 1/2023 | Palomares et al. |
| 11,919,636 B2 | 3/2024 | Clark et al. |
| 2003/0187560 A1 | 10/2003 | Keller et al. |
| 2006/0213167 A1 | 9/2006 | Koselka et al. |
| 2014/0021267 A1 | 1/2014 | Sudduth et al. |
| 2014/0168412 A1 | 6/2014 | Shulman et al. |
| 2014/0180549 A1 | 6/2014 | Siemens et al. |
| 2014/0360811 A1 | 12/2014 | Ross et al. |
| 2015/0075067 A1 | 3/2015 | Stowe et al. |
| 2016/0150729 A1 | 6/2016 | Moore |
| 2016/0157429 A1 | 6/2016 | Pitzer et al. |
| 2016/0224703 A1 | 8/2016 | Shriver |
| 2017/0034986 A1 | 2/2017 | Koch et al. |
| 2017/0049044 A1 | 2/2017 | Stoller et al. |
| 2017/0161560 A1 | 6/2017 | Itzhaky et al. |
| 2017/0206415 A1 | 7/2017 | Redden |
| 2017/0219711 A1 | 8/2017 | Redden et al. |
| 2017/0223947 A1 | 8/2017 | Gall et al. |
| 2017/0345398 A1 | 11/2017 | Fuchs et al. |
| 2017/0359943 A1 | 12/2017 | Calleija et al. |
| 2018/0114305 A1 | 4/2018 | Strnad et al. |
| 2018/0128933 A1 | 5/2018 | Koch et al. |
| 2018/0139947 A1 | 5/2018 | Albert et al. |
| 2018/0153084 A1 | 6/2018 | Calleija et al. |
| 2018/0184581 A1 | 7/2018 | Morgan et al. |
| 2018/0238823 A1 | 8/2018 | Puhalla et al. |
| 2018/0242517 A1 | 8/2018 | Davis et al. |
| 2018/0243772 A1 | 8/2018 | Davis et al. |
| 2018/0279556 A1 | 10/2018 | Briquet-Kerestedjian et al. |
| 2018/0295783 A1 | 10/2018 | Alexander et al. |
| 2018/0325019 A1 | 11/2018 | Connell et al. |
| 2019/0032305 A1 | 1/2019 | Hageman et al. |
| 2019/0050948 A1 | 2/2019 | Perry et al. |
| 2019/0059206 A1 | 2/2019 | Stanhope et al. |
| 2019/0064363 A1 | 2/2019 | Redden et al. |
| 2019/0104722 A1 | 4/2019 | Slaughter et al. |
| 2019/0110394 A1 | 4/2019 | Vannahmen |
| 2019/0150357 A1 | 5/2019 | Wu et al. |
| 2019/0239502 A1 | 8/2019 | Palomares et al. |
| 2019/0285422 A1 | 9/2019 | Opitsch et al. |

(56) References Cited

U.S. PATENT DOCUMENTS

| | | |
|---|---|---|
| 2019/0289767 A1 | 9/2019 | Gulotta |
| 2019/0311198 A1 | 10/2019 | Zemenchik |
| 2020/0000081 A1 | 1/2020 | Palomares et al. |
| 2020/0011019 A1 | 1/2020 | Serrat et al. |
| 2020/0015408 A1 | 1/2020 | Armstead |
| 2020/0019777 A1 | 1/2020 | Gurzoni et al. |
| 2020/0029490 A1 | 1/2020 | Bertucci et al. |
| 2020/0045953 A1 | 2/2020 | Serrat et al. |
| 2020/0049635 A1 | 2/2020 | Couture et al. |
| 2020/0057443 A1 | 2/2020 | Silver et al. |
| 2020/0068783 A1 | 3/2020 | Strnad et al. |
| 2020/0084965 A1 | 3/2020 | Neitemeier et al. |
| 2020/0107490 A1 | 4/2020 | Zemenchik |
| 2020/0196535 A1 | 6/2020 | Dagondon et al. |
| 2020/0214203 A1 | 7/2020 | Young et al. |
| 2020/0214215 A1 | 7/2020 | Kemmerer et al. |
| 2020/0221624 A1 | 7/2020 | Turner et al. |
| 2020/0221628 A1 | 7/2020 | Blunier et al. |
| 2020/0221630 A1 | 7/2020 | Pomedli |
| 2020/0221638 A1 | 7/2020 | Engel et al. |
| 2020/0221651 A1 | 7/2020 | Klingler et al. |
| 2020/0221681 A1 | 7/2020 | Schwaderer et al. |
| 2020/0230633 A1 | 7/2020 | Serrat et al. |
| 2020/0236838 A1 | 7/2020 | Smith |
| 2020/0236841 A1 | 7/2020 | Thompson |
| 2020/0242754 A1 | 7/2020 | Peters |
| 2020/0249217 A1 | 8/2020 | Stanhope et al. |
| 2020/0282969 A1 | 9/2020 | Manji |
| 2020/0296875 A1 | 9/2020 | Calleija et al. |
| 2020/0296885 A1 | 9/2020 | Stoller et al. |
| 2020/0302170 A1 | 9/2020 | Polzounov et al. |
| 2020/0340203 A1 | 10/2020 | Torii |
| 2020/0352086 A1 | 11/2020 | Stoller et al. |
| 2020/0352098 A1 | 11/2020 | Fujii et al. |
| 2020/0355829 A1 | 11/2020 | Redden et al. |
| 2020/0359565 A1 | 11/2020 | Yamada et al. |
| 2020/0367430 A1 | 11/2020 | Ito et al. |
| 2020/0367431 A1 | 11/2020 | Ito et al. |
| 2020/0375094 A1 | 12/2020 | Calleija et al. |
| 2020/0383268 A1 | 12/2020 | Fujii et al. |
| 2021/0000006 A1 | 1/2021 | Ellaboudy et al. |
| 2021/0022282 A1 | 1/2021 | Wallach et al. |
| 2021/0031624 A1 | 2/2021 | Ishikawa et al. |
| 2021/0037695 A1 | 2/2021 | Strnad et al. |
| 2021/0051839 A1 | 2/2021 | Strnad et al. |
| 2021/0058603 A1 | 2/2021 | Redden |
| 2021/0080972 A1 | 3/2021 | Iwami et al. |
| 2021/0105995 A1 | 4/2021 | Palomares et al. |
| 2021/0137015 A1 | 5/2021 | Ibuki et al. |
| 2021/0149406 A1 | 5/2021 | Javault et al. |
| 2021/0161059 A1 | 6/2021 | Kaufmann |
| 2021/0192180 A1 | 6/2021 | Wang et al. |
| 2021/0243933 A1 | 8/2021 | Antle et al. |
| 2021/0243937 A1 | 8/2021 | Antle et al. |
| 2021/0243940 A1 | 8/2021 | Snyder et al. |
| 2021/0248690 A1 | 8/2021 | Colgan et al. |
| 2021/0250526 A1 | 8/2021 | Germain |
| 2021/0307227 A1 | 10/2021 | Redden |
| 2021/0325346 A1 | 10/2021 | Khait et al. |
| 2021/0327133 A1 | 10/2021 | Redden et al. |
| 2021/0378187 A1 | 12/2021 | Redden et al. |
| 2021/0406540 A1 | 12/2021 | Redden et al. |
| 2022/0007631 A1 | 1/2022 | Brown et al. |
| 2022/0022360 A1 | 1/2022 | Redden |
| 2022/0053689 A1 | 2/2022 | Brown et al. |
| 2022/0071192 A1 | 3/2022 | Benoit-Levy et al. |
| 2022/0076065 A1 | 3/2022 | Benoit-Levy et al. |
| 2022/0087094 A1 | 3/2022 | Redden et al. |
| 2022/0092705 A1 | 3/2022 | Khait et al. |
| 2022/0142142 A1 | 5/2022 | Van Alphen |
| 2022/0148100 A1 | 5/2022 | Khait et al. |
| 2022/0174933 A1 | 6/2022 | Smith |
| 2022/0174934 A1 | 6/2022 | Germain |
| 2022/0256832 A1 | 8/2022 | Serrat et al. |
| 2022/0327183 A1 | 10/2022 | Russo et al. |
| 2022/0394912 A1 | 12/2022 | Barklund |
| 2023/0043631 A1 | 2/2023 | Sandbrook |
| 2023/0413798 A1 | 12/2023 | Sibley et al. |
| 2024/0032450 A1 | 2/2024 | Herlitzius et al. |

FOREIGN PATENT DOCUMENTS

| | | |
|---|---|---|
| BR | 112019016157 A2 | 3/2020 |
| BR | 112019016644 A2 | 3/2020 |
| BR | 112019016111 A2 | 4/2020 |
| BR | 112022000718 A2 | 3/2022 |
| CA | 3050364 A1 | 8/2018 |
| CA | 3052114 A1 | 8/2018 |
| CA | 3054649 A1 | 8/2018 |
| CA | 3147000 A1 | 1/2021 |
| CA | 3146705 A1 | 3/2021 |
| CN | 106912331 A | 7/2017 |
| CN | 107846848 A | 3/2018 |
| CN | 110520896 A | 11/2019 |
| CN | 113597874 A | 11/2021 |
| DE | 102017204650 A1 | 9/2018 |
| DE | 102019218177 A1 | 5/2021 |
| DE | 102019218182 A1 | 5/2021 |
| DE | 102019218186 A1 | 5/2021 |
| DE | 102019218187 A1 | 5/2021 |
| DE | 102019218188 A1 | 5/2021 |
| DE | 102019218192 A1 | 5/2021 |
| DE | 202017007481 U1 | 12/2021 |
| DK | 3316673 T3 | 12/2020 |
| EP | 3323300 A1 | 5/2018 |
| EP | 3355675 A1 | 8/2018 |
| EP | 3357332 A1 | 8/2018 |
| EP | 3358525 A1 | 8/2018 |
| EP | 3323300 B1 | 6/2019 |
| EP | 3576526 A1 | 12/2019 |
| EP | 3577628 A1 | 12/2019 |
| EP | 3585168 A1 | 1/2020 |
| EP | 3666622 A1 | 6/2020 |
| EP | 3667555 A1 | 6/2020 |
| EP | 3682201 A1 | 7/2020 |
| EP | 3358525 B1 | 9/2020 |
| EP | 3316673 B1 | 11/2020 |
| EP | 3585168 B1 | 3/2021 |
| EP | 3830662 A1 | 6/2021 |
| EP | 3922099 A1 | 12/2021 |
| EP | 3937628 A1 | 1/2022 |
| EP | 3357332 B1 | 4/2022 |
| EP | 3998843 A1 | 5/2022 |
| EP | 4021655 A1 | 7/2022 |
| EP | 4040953 A1 | 8/2022 |
| ES | 2846786 T3 | 7/2021 |
| FR | 3058616 A1 | 5/2018 |
| FR | 3063206 A1 | 8/2018 |
| FR | 3058616 B1 | 12/2018 |
| FR | 3071124 A1 | 3/2019 |
| FR | 3071124 B1 | 9/2019 |
| FR | 3093613 A1 | 9/2020 |
| FR | 3093614 A1 | 9/2020 |
| FR | 3098684 A1 | 1/2021 |
| FR | 3098962 A1 | 1/2021 |
| FR | 3063206 B1 | 8/2021 |
| FR | 3100140 B1 | 9/2021 |
| FR | 3110743 A1 | 11/2021 |
| FR | 3098962 B1 | 12/2021 |
| FR | 3110743 B1 | 4/2022 |
| GB | 2096874 A | 10/1982 |
| JP | 2013059296 A | 4/2013 |
| JP | 2020510771 A | 4/2020 |
| JP | 6737535 B2 | 7/2020 |
| JP | 2021136919 A | 9/2021 |
| JP | 7110236 B2 | 7/2022 |
| KR | 20190126060 A | 11/2019 |
| MX | 2019009306 A | 12/2019 |
| WO | 2018141995 A1 | 8/2018 |
| WO | 2018142371 A1 | 8/2018 |
| WO | 2018154490 A1 | 8/2018 |
| WO | 2019053364 A1 | 3/2019 |
| WO | 2020039434 A1 | 2/2020 |
| WO | 2020120802 A1 | 6/2020 |

(56) References Cited

FOREIGN PATENT DOCUMENTS

| | | |
|---|---|---|
| WO | 2020120804 A1 | 6/2020 |
| WO | 2020182840 A1 | 9/2020 |
| WO | 2021009710 A1 | 1/2021 |
| WO | 2021037417 A1 | 3/2021 |
| WO | 2021055485 A1 | 3/2021 |
| WO | 2021069980 A1 | 4/2021 |
| WO | 2021090294 A1 | 5/2021 |
| WO | 2021105006 A1 | 6/2021 |
| WO | 2021105014 A1 | 6/2021 |
| WO | 2021105015 A1 | 6/2021 |
| WO | 2021105017 A1 | 6/2021 |
| WO | 2021144785 A1 | 7/2021 |
| WO | 2021159123 A1 | 8/2021 |
| WO | 2021159124 A1 | 8/2021 |
| WO | 2021159125 A1 | 8/2021 |
| WO | 2021234063 A1 | 11/2021 |
| WO | 2022064482 A1 | 3/2022 |
| WO | 2022137217 A1 | 6/2022 |
| WO | 2022172274 A1 | 8/2022 |

LED boards mounts (e.g., LEDs angled and positioned so that together they cover a rectangular surface on the ground plane)

acrylic lens cover (e.g., designed for rectangular output shape)

Ripple pattern designed to bias light output in one direction (e.g., to form rectangular output shape)

Shape designed to fit the LED output for maximum efficiency

CROP DETECTION SYSTEM AND/OR METHOD

CROSS-REFERENCE TO RELATED APPLICATIONS

This application claims the benefit of U.S. Provisional Application No. 63/443,936, filed 7 Feb. 2023, and U.S. Provisional Application No. 63/468,111, filed 22 May 2023, each of which is incorporated in its entirety by this reference.

TECHNICAL FIELD

This invention relates generally to the agriculture automation field, and more specifically to a new and useful crop detection system and/or method in the agriculture automation field.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 3A and 3B are an exploded view and an assembly view of a variant of the system, respectively.

DESCRIPTION OF THE PREFERRED EMBODIMENTS

Figure 1:
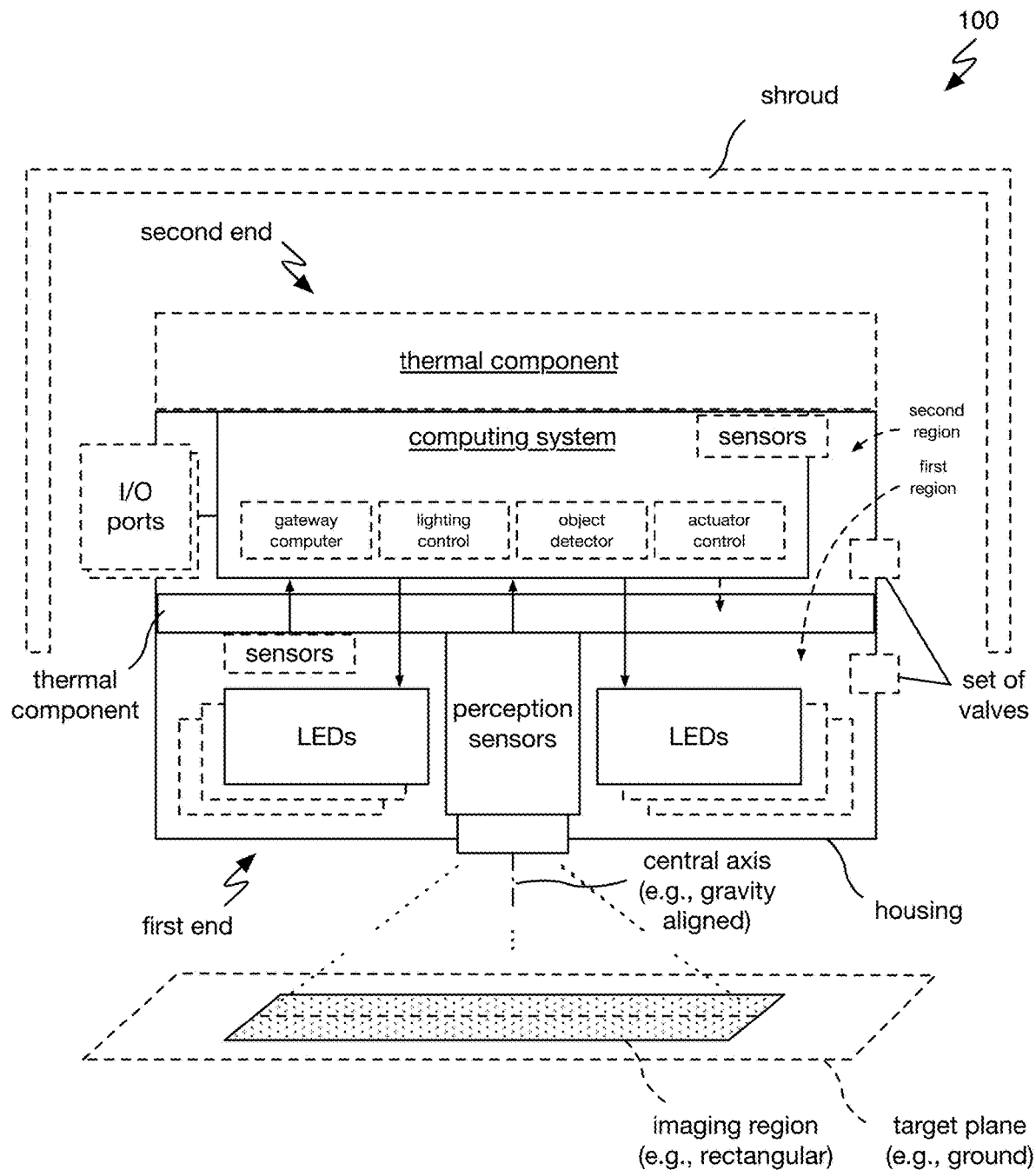
FIG. 1 is a schematic representation of a variant of the system.

The following description of the preferred embodiments of the invention is not intended to limit the invention to these preferred embodiments, but rather to enable any person skilled in the art to make and use this invention.

1. Overview

The system 100 can include a set of sensors; a plurality of Light-Emitting Diodes (LEDs); a computing system; a housing; and a set of thermal components. The system can optionally include a set of valves. However, the system 100 can additionally or alternatively include any other suitable set of components. The system can function to detect plants (e.g., plant presence, plant features and/or attributes, etc.) and/or control a set of actuators (e.g., implement effector; implement actuators, etc.) based on the plant detections. Additionally or alternatively, the system can function to localize plants (e.g., plant meristems) and/or other objects (e.g., weeds) using measurements from the set of sensors. Additionally or alternatively, the system can function to thermally condition an interior(s) of the housing and/or components therein to facilitate operation of system components (e.g., cameras, processors, LEDs, etc.), such as, but not limited to, those which may be sensitive to: variations in temperature and/or humidity, extreme temperature and/or humidity; and/or any other system components.

The term "implement" as utilized herein, in the context of agricultural machinery, weeding systems, or otherwise, can refer to a farm implement, agriculture implement, and/or other suitable implement(s), and these terms—along with at least: "tool," "actuator," and "equipment,"—may be interchangeably referenced herein. For example, the implement may be a pushed and/or pulled by a vehicle (e.g., a tractor) to facilitate one or more agricultural operations (e.g., weeding, crop data collection, pesticide/herbicide spraying, harvesting, etc.), and/or can be otherwise operated. However, it is understood that the modular (implement) assembly may be likewise configured to perform various agricultural operations (e.g., weeding, crop data collection, pesticide/herbicide spraying, harvesting, etc.), data collection/processing, and/or may operate in conjunction with various effectors and/or without an effector (e.g., to perform crop data collection).

The term "substantially" as utilized herein can mean: exactly, approximately, within a predetermined threshold or tolerance, and/or have any other suitable meaning.

The method 200 can include any or all of: activating a set of lighting elements S100; collecting a set of images S200; and processing the set of images S300. Additionally or alternatively, the method can include any or all of: actuating and/or otherwise activating a set of implements S400; training and/or updating (e.g., retraining) a set of models used in processing the set of images S500; and/or any other suitable processes.

The method 200 can be performed with a system 100 as described above and/or with any other suitable system(s).

2. Benefits

Variations of the technology can afford several benefits and/or advantages.

First, variations of the technology can provide reliable crop detection and/or localization under a variety of field and lighting conditions. Such variants can provide direct (supplemental) lighting which may reduce or eliminate the influence of varying ambient lighting conditions (e.g., daytime lighting, overcast lighting, shade/shadows, nighttime lighting, etc.) on system operation and/or plant detection.

The technology can optionally additionally confer the benefit of managing (e.g., minimizing, directing/re-directing, etc.) heat generated by the direct lighting (and/or internal components of the system), which can enable components of the system to operate effectively (e.g., without damage, with minimal degradation, in optimal states, with increased and/or maximal functionality, etc.). In some examples, for instance, the technology includes a multi-component thermal management system which transfers heat within and/or out of a housing of a system.

Second, variations of the technology can provide modular sensing and/or processing (i.e., crop detection processing) which can be flexibly reconfigured and/or scaled to accommodate a range of crop bed spacings and field conditions (e.g., examples are shown in FIGS. 8A-8F and FIG. 9), which can enable agriculture operations in a variety of field settings. For example, the system can facilitate inter-row and/or intra-row (mechanical) weed removal with sub-inch precision, reducing or eliminating the need for hand-weeding crews (e.g., which may conventionally be employed for a variety of vegetable crops, such as lettuce and broccoli; when deployed in conjunction with a weeding implement and/or weeding module; etc.).

The system can be associated with as single row (e.g., able to image a single row's width only), a portion of a single row (e.g., wherein multiple systems are used to image a row in total), multiple rows, and/or any other region of any suitable size. Rows can be of any suitable dimensions, such as having widths of: 15 inches, 20 inches, 30 inches, 60 inches, any open or closed range bounded by the aforementioned values and/or values between the aforementioned values, and/or any other suitable widths.

In preferred embodiments of the system, for instance, the system is configured to allow users to easily deploy machinery for precision detection, localization, and actuation on a wide variety of agricultural machinery. In examples, for instance, the system is configured for use in an easily deployable, modular, implement-agnostic manner through the inclusion of integrated lighting, optical detection, compute, height detection, local sensing, and visual odometry in the system.

Third, variations of the technology can facilitate operation under influence of a variety of ambient conditions (e.g., as experienced in a crop field) and external factors. For example, variants can provide ingress protection to sensors and/or processors, which may facilitate operation under harsh field environments. Such variants can facilitate operation under high ambient humidity (e.g., 100% humidity; greater than 80% humidity; variants can operate within a range of 0-100% humidity; etc.), such as may exist in various field environments and/or tropical climates. Additionally, variants can further provide humidity (e.g., condensation) rejection and/or dehumidification of a housing enclosure(s) to enable prolonged operation (e.g., even under partial humidity ingress; rejecting any water/humidity which may collect within sealed enclosures over time; rejecting and/or removing any water or liquids which may collect on a lens; etc.). Additionally, variants can facilitate cooling of lighting systems, sensors, and/or processors under high ambient temperatures (e.g., 45 deg C.) and/or under direct solar load.

Fourth, variations of the technology can streamline integration of embedded perception, intelligence, and control within farm implements. Such variants can provide edge compute, sensing, and/or control (e.g., without reliance on centralized processing of perception data or a central control system), which can reduce the integration burden associated with implementation of machine vision/control (e.g., wiring, networked communications, etc.; providing 'plug-and-play' detection and control capability for various effectors).

However, variations of the technology can additionally or alternately provide any other suitable benefits and/or advantages.

3. System

The system 100, an example of which is shown in FIG. 1, can include a set of sensors; a plurality of Light-Emitting Diodes (LEDs); a computing system; a housing; and a set of thermal components. The system can optionally include a set of valves. However, the system 100 can additionally or alternatively include and/or interface with any other suitable set(s) of components, such as, but not limited to, any or all of the components described in U.S. application Ser. No. 16/267,362, filed 4 Feb. 2019; U.S. application Ser. No. 16/539,390, filed 13 Aug. 2019; U.S. application Ser. No. 17/100,773, filed 20 Nov. 2020; and U.S. application Ser. No. 17/079,251, filed 23 Oct. 2020; each of which is incorporated herein in its entirety by this reference. The system can function to detect plants and/or control a set of actuators (e.g., implement effector; implement actuators, etc.) based on the plant detections. Additionally or alternatively, the system can function to localize plants (e.g., plant meristems, weeds, crops, etc.) and/or other agricultural materials (e.g., actuators, fertilizer, dirt, plant beds, etc.), characterize and/or otherwise analyze plants and agricultural materials (e.g., differentiating between desired and undesired plants, determining a type of plant, determining a size of plant, determining a maturity of plant, identify portions of a plant [e.g., leaves vs. stem vs. flower; meristem, etc.], etc.), and/or localize or analyze any other objects (e.g., obstructions, etc.) using measurements from the set of sensors. Additionally or alternatively, the system can function to condition an interior(s) of the housing and/or components therein to facilitate operation of system components (e.g., cameras, processors, LEDs, etc.; which may be sensitive to variation in temperature and/or humidity, which may be sensitive to extreme values [e.g., temperature above a threshold, temperature below a threshold, humidity above a threshold, etc.] in operating conditions, etc.).

Figure 5:
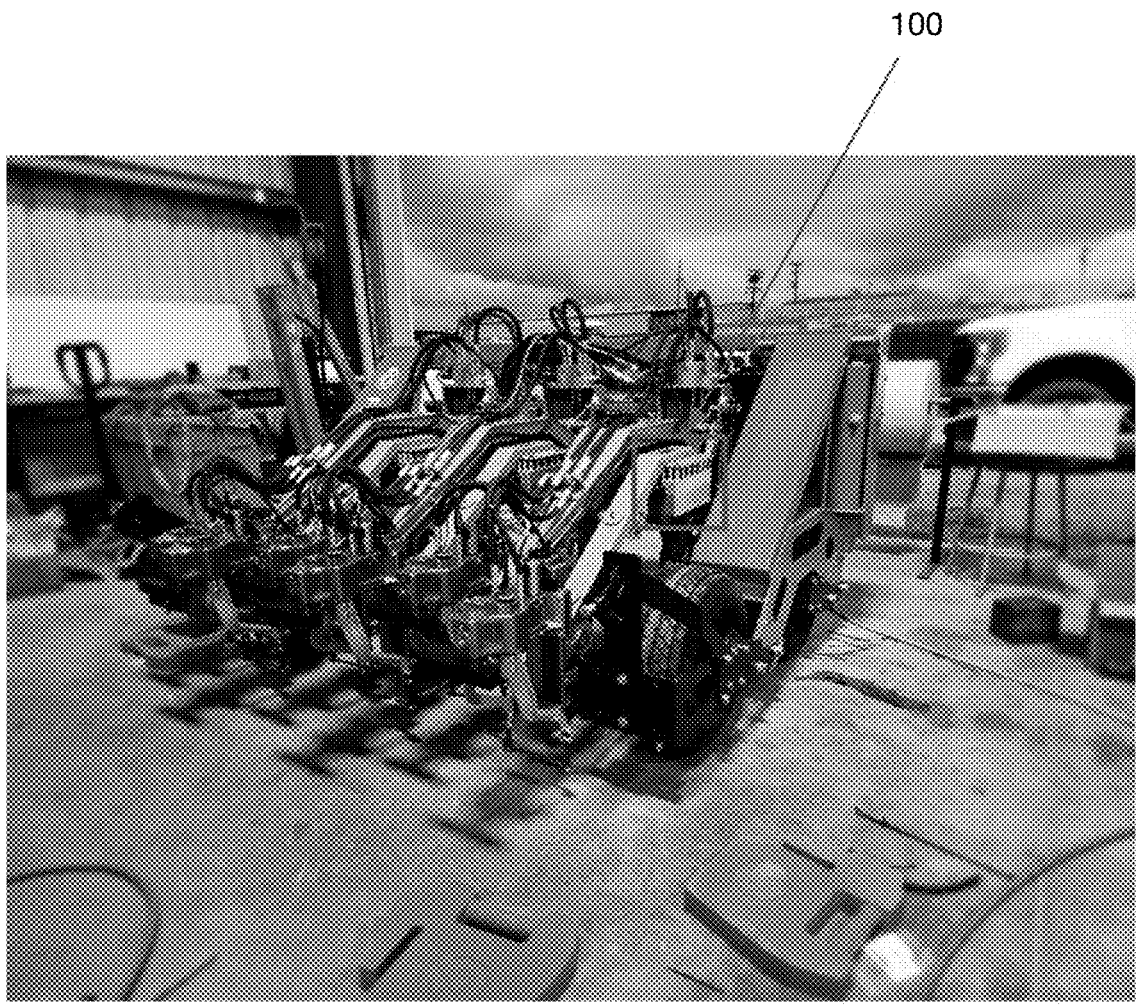
FIG. 5 is an example arrangement of the system, integrated with an implement.
Figure 11:
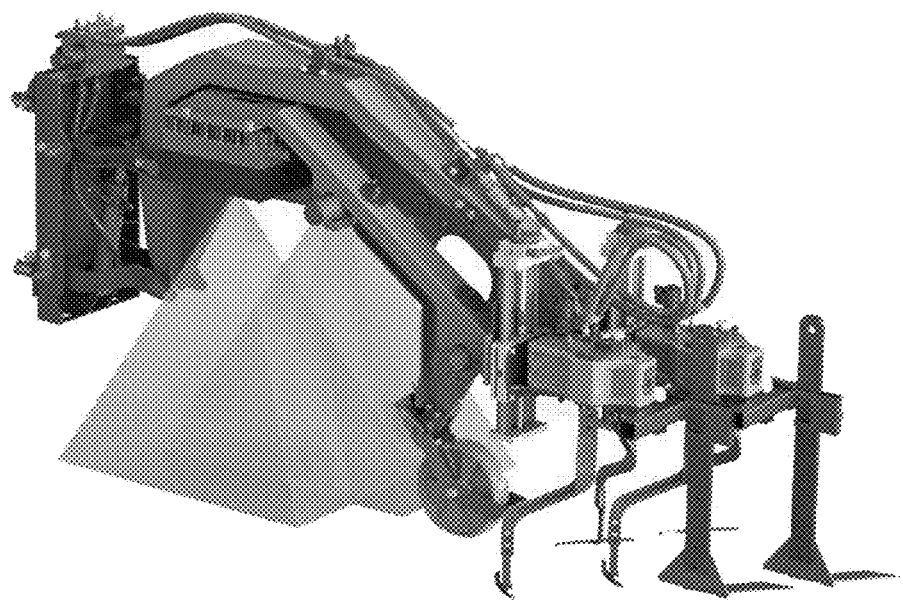
FIG. 11 is an example illustration of an arrangement of an implement integrating a variant of the system and/or method.

The system is preferably modular and/or monolithic (e.g., with components packaged and/or sealed within a unitary enclosure and/or as a unitary assembly), but can additionally or alternatively can be an assembly of components which are cooperatively packaged and/or configured to be cooperatively mounted (e.g., such as on a modular implement; an example is shown in FIG. 5; a second example is shown in FIG. 11); and/or can be otherwise implemented. For example, the computing system, sensors, and LEDs can be packaged within the housing (e.g., with integrated thermal management and/or a heat sink[s]), allowing the system to be modularly integrated into a farm implement.

The set of sensors functions to collect measurements and/or sensor data which can be used by the computing system to facilitate automatic control (e.g., of an implement to which the system is coupled, of an implement remote from the system, of multiple implements, of other components of the system, etc.). Additionally or alternatively, the set of sensors function to collect perception data which can be used to facilitate automatic plant detection (e.g., meristem detection and/or location tracking) and/or actuator control based on the plant detections. Additionally or alternatively, the set of sensors can collect plant-level data which can be used to monitor crops (e.g., individually) within a field. Additionally or alternatively, the set of sensors can function to measure changes in the (relative) bed height, which can be used to facilitate actuator control (e.g., to adjust the height of the enclosure/sensors).

The set of sensors can include: perception sensors (e.g., cameras, time-of-flight sensors, etc.), cameras and/or other optical sensors (e.g., RGB camera[s], stereo camera, stereo camera pairs, charge-coupled device [CCD] cameras, Complimentary Metal Oxide Semiconductor [CMOS] cameras, infrared [IR] sensors, etc.) LIDAR, time-of-flight sensors (e.g., Lidar scanner, etc.), a range imaging sensors (e.g., stereo triangulation, sheet of light triangulation, structured light scanner, time-of-flight, interferometry, etc.), environmental sensors (e.g., temperature, pressure, humidity, etc.), location sensors (e.g., Global Positioning System [GPS]/ Global Navigation Satellite System [GNSS]), position/displacement sensors (e.g., to detect plant bed height, to be used in actuating or positioning any or all of the system, etc.), proximity sensors, external antennas (e.g., GPS, cellular, Bluetooth, Wi-Fi, Near Field Communication, etc.), diagnostic sensors, temperature sensors, humidity sensors, and/ or any other suitable set of sensors.

In preferred variants, the set of sensors includes at least a set of optical sensors, which can individually and/or collectively function to image and/or detect other information (e.g., height) associated with crops, plants, crop beds, and/or any other objects. The set of optical sensors preferably includes multiple optical sensors, which can be of the same type, different types (e.g., stereo cameras and mono lens cameras, stereo cameras and infrared sensors, etc.), any combination, or any other types of cameras.

The set of optical sensors can acquire any or all of: visible light spectrum information (e.g., 380 to 700 nanometer [nm] light); infrared spectrum information (e.g., 750 nm to 1000 microns, 700-750 nm, 880 nm, between 850-900 nm, etc.); near-infrared information; spectral information; hyperspectral information; and/or any other types of information.

The optical sensors can optionally include or interface with any or all of: physical filters (e.g., notch filter), lenses, and/or other accessories. These can function for instance to: protect the optical sensors; adjust the wavelength of light/ radiation that is able to be detected by the optical sensor; and/or otherwise be used.

In use cases including multiple systems (e.g., multiple housings each coupled to a different arm or regions of a farm implement, multiple housings coupled to different farm implements, etc.), the optical system(s) can be configured to ensure that they collectively do not perceive the same plant to be different plants, such as due to overlapping fields of view. In some examples, this is enabled through masking and/or filtering (e.g., of the cameras, of the images, etc.) to avoid overlapping light and/or image patterns. Additionally or alternatively, the optical systems can be configured with a particular FOV (e.g., rectangular FOV aligned with the rectangular lighting region as described below), such as an FOV that only views a single row of crops, such that there is no overlap in detected crops among different systems. Further additionally or alternatively, any or all software processes and/or models implemented in the method can be configured to detect an overlap of image content among systems.

The sensors can be arranged into sensor arrays (e.g., camera array) and/or not arrayed (e.g., single RGB camera). For variants include arrays, the sensors of the arrays can be rigidly fixed relative to each other, moveable relative to each other, removably coupled relative to each other, and/or otherwise fixed or unfixed.

Perception sensors are preferably calibrated within a predetermined pose (e.g., position and orientation) and/or coordinate frame (e.g., where the pose of perception sensors is substantially maintained relative to the ground by dynamic control of an implement/actuator) and/or can be substantially maintained in a fixed/predetermined arrangement relative to the surface of the bed (e.g., fixed position relative to a target plane, such as a ground plane). This can function, for instance, to maintain a uniform closeness (e.g., distance) and/or orientation (e.g., angle) of any or all sensors relative to the imaged subject (e.g., surface of plant bed, plants, etc.), which in turn can enable: accurate detections to be made with one or more models (e.g., as described below), accurate detections to be made at high speeds (e.g., to increase an efficiency of an agricultural process utilizing one or more implements), comparability among images, and/or any other outcomes. Alternatively, perception data can be pre-processed and/or post-processed to adjust for changes in the height and/or angle of the sensors relative to the bed, such as by bundle adjustment (e.g., minimizing the reprojection error between the pixel locations of observed and predicted image points), homography, and/or other suitable image processing and/or pose estimation techniques.

Figure 16A:
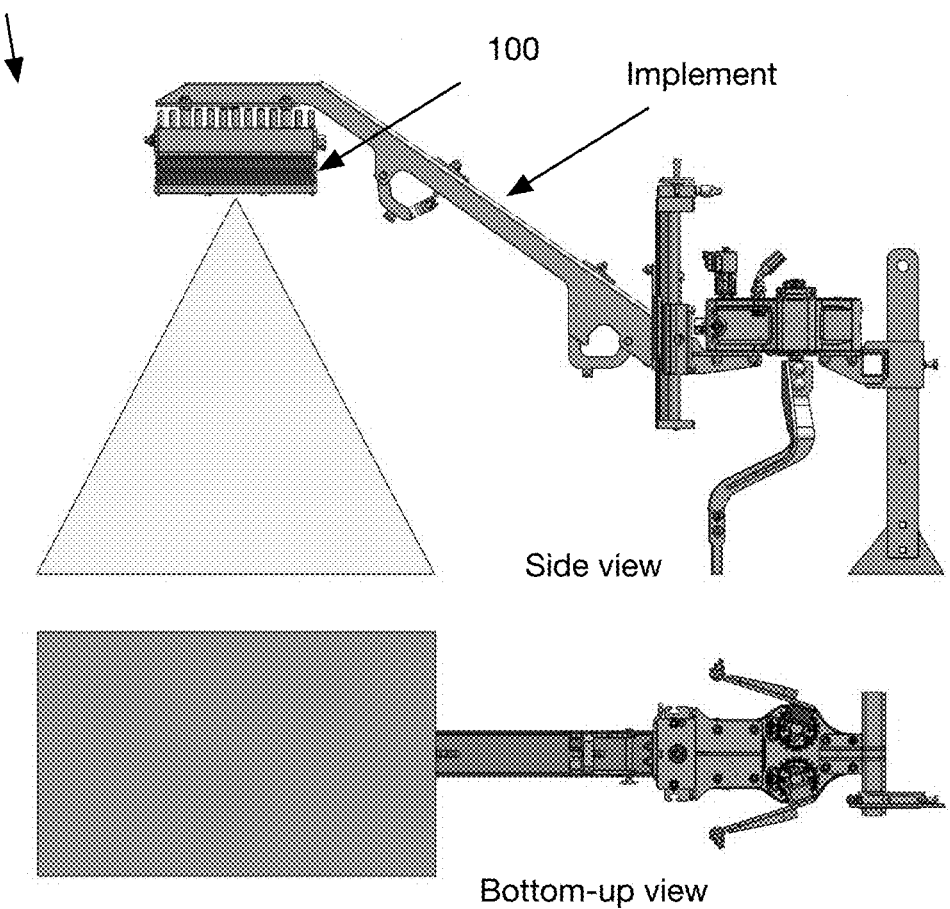
FIGS. 16A-16B are example views of a first and second arrangement of the system, respectively.

In a first example, the set of sensors can include one or more cameras with a gravity-aligned field-of-view (e.g., oriented vertically downward; 'top-down' field of view; an example is shown in FIG. 16A), which is substantially orthogonal to a top surface/plane of the bed. In this example, the set of actuators can be dynamically controlled to substantially maintain the height (and/or pose) of the camera(s) relative to the ground. The height of the camera(s) can be: less than 25 cm, 25 cm, 50 cm 55 cm, 55 cm, 60 cm, 65 cm, 70 cm, 75 cm, 85 cm, 100 cm, 125 cm, 200 cm, greater than 200 cm, any open or closed range bounded by the aforementioned values and/or values between the aforementioned values, and/or any other suitable height; which may advantageously facilitate high-resolution 'crop-level' perception. Moreover, top-down perception may simplify image processing and/or improve CV-analysis as it may inherently reduce the various sources of error (e.g., projection errors, lighting differences, etc.).

Figure 16B:
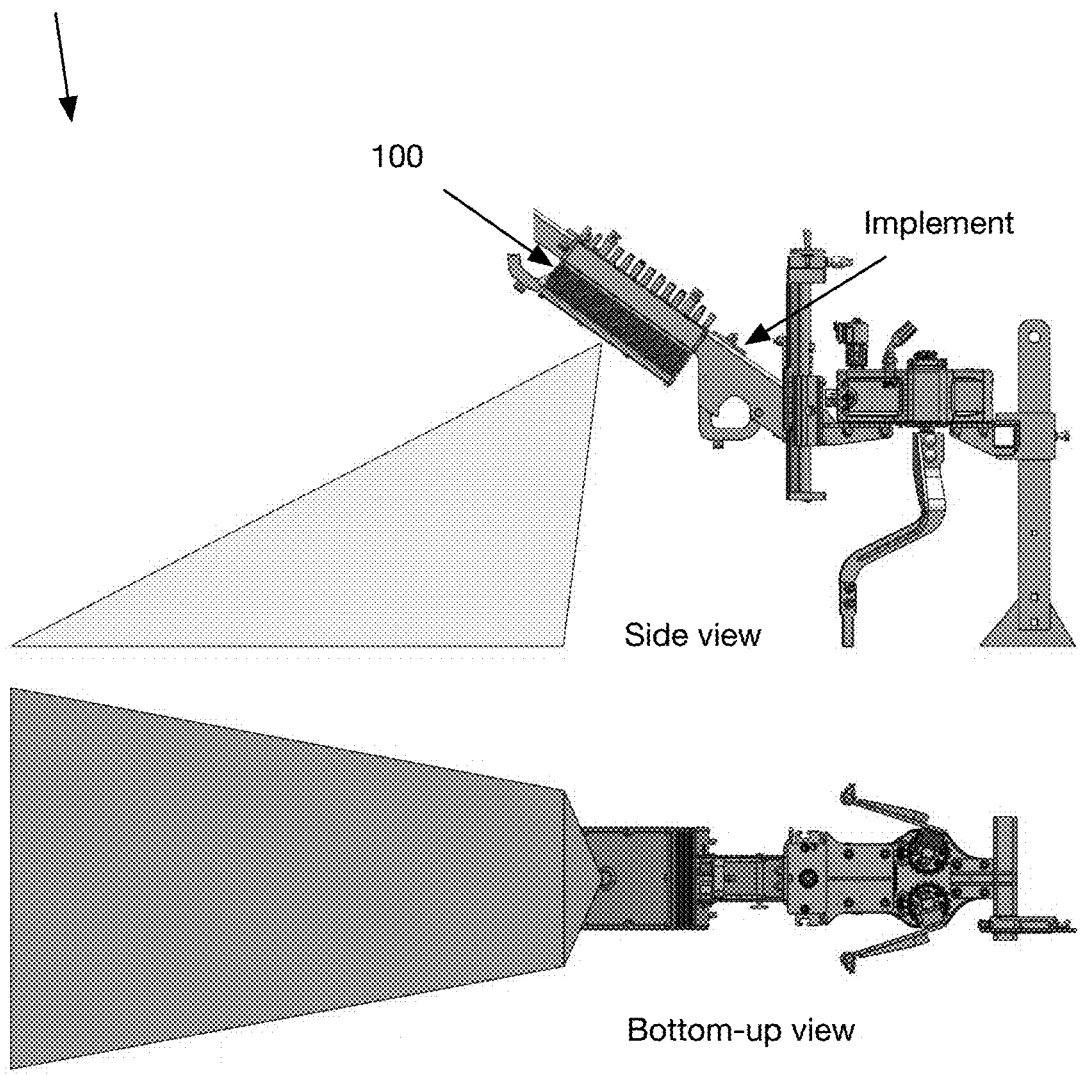
Figure 17:
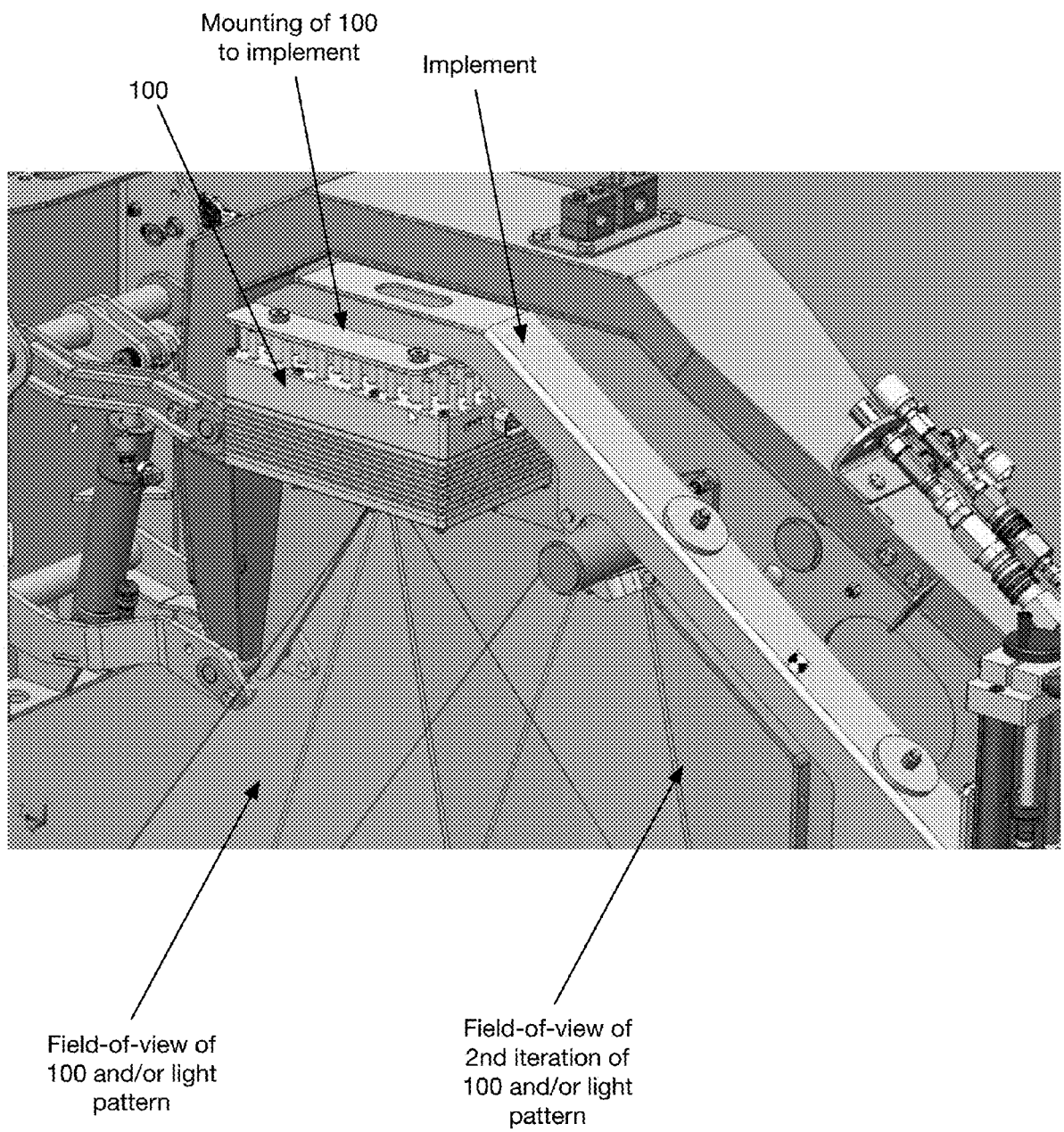
FIG. 17 depicts an example of the system mounted to an agricultural implement.

In a second example, additional or alternative to the first, the perception sensors can be angled forwards (e.g., towards a forward horizon line relative to top-down, an example is shown in FIG. 16B), which may advantageously increase the longitudinal span of the field of view (e.g., increasing the number of frames capturing a given plant), thereby reducing the height and/or length of the system needed to capture the same volume of perception data (e.g., which may reduce the overall vehicle mass and footprint along with the associated integration burden). Additionally or alternatively, the angle can be configured to increase a number of rows (e.g., crop rows) and/or other area able to be perceived by the sensors. This can function, for instance, to increase an efficiency with which an implement can process a total area, such as when using implements that require a relatively low accuracy and/or resolution (e.g., spraying).

In a third example, additional or alternative to those above, the perception sensors can include a stereo camera (e.g., camera with two or more lenses and/or image sensors) and/or arrangement of multiple cameras, wherein the perception sensors enable depth estimation (e.g., to determine plant bed height, to determine ground height, etc.) to be performed during sensor transit (e.g., at high velocities, at high accuracies, etc.). Additionally or alternatively, the stereo camera and/or multi-camera arrangement can convey any other suitable information (e.g., an angle of the system relative to the ground, an angle of the system relative to the implement, etc.).

In a fourth example, additional or alternative to those above, the perception sensors utilize a set of depth sensors separate from the optical subsystem (e.g., to be used with a single mono lens camera), where the depth sensors are used to continuously determine a ground depth (e.g., plant bed height), which can be used for any or all of: adjusting parameters associated with the implement; adjusting parameters associated with one or more perception sensors; adjusting a position of the system or components of the system; providing the depth information as an input to a set of models and/or processors; and/or for any other uses. In a particular specific example, the depth sensors contact the ground as the implement moves. In an alternative specific example, the depth sensors are remote from (e.g., offset from, coupled to the system, etc.) the ground as the implement moves.

In a fifth example, additional or alternative to those above, the set of optical sensors includes at least one stereo camera (e.g., centrally located stereo camera) along with an infrared sensor (e.g., to detect plant health, to detect water content of a crop, to otherwise characterize plants, etc.).

Additionally or alternatively, the set of optical sensors can be otherwise suitably configured and/or arranged.

Figure 6:
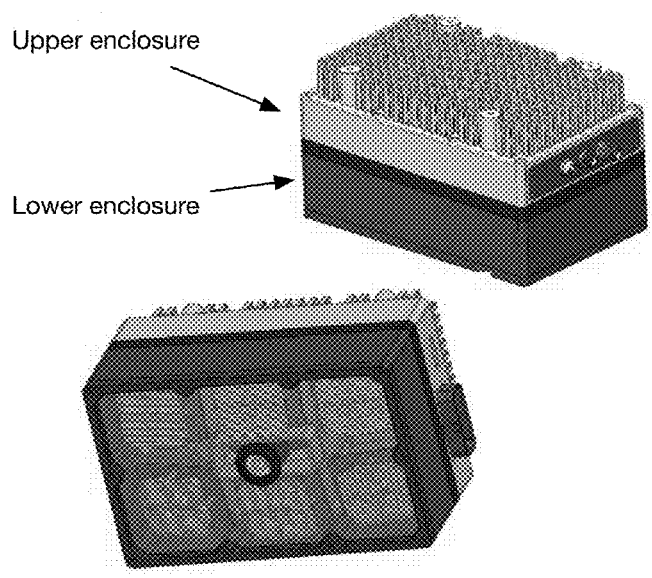
FIG. 6 is an example of a variant of the system.
Figure 13:
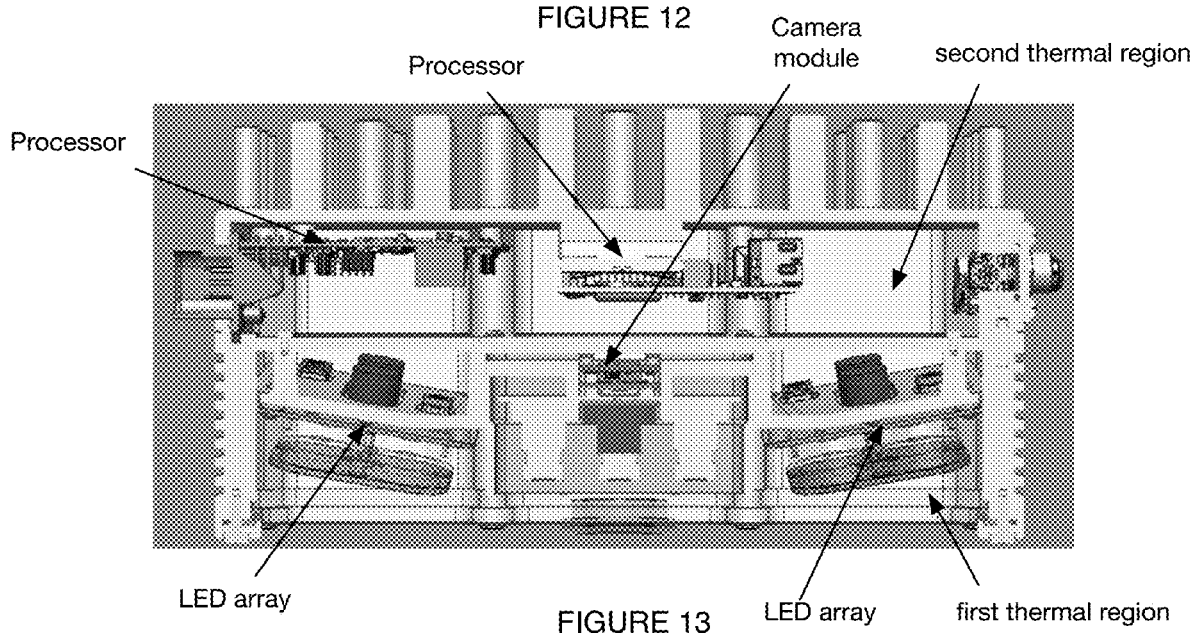
FIG. 13 is a cross-sectional representation of a variant of the system.

The set of sensors can additionally include a set of temperature sensors, such as: within the housing (e.g., a first temperature sensor within a first thermal region of the housing and a second temperature sensor within a second thermal region of the housing), thermally connected to heat-generating components (e.g., LEDs, computing system, etc.; integrated on a board[s] of the computing system and/or LED mounting plates, etc.), proximal to temperature-sensitive components of the system (e.g., camera temperature sensor, a perception module, etc.; integrated into the component, thermally coupled to the component, within the same thermal region as the component, etc.), and/or any other suitable temperature sensor(s). Temperature sensors can be used to dynamically control thermal components, such as cooling devices (e.g., Peltier cooler a.k.a., Peltier heat pump, solid state refrigerator, and/or thermoelectric cooler [TEC]; active cooling devices such as fans, refrigeration systems, etc.), to maintain components within predetermined temperature ranges (e.g., manufacturer specified temperature ranges), inform processing of the collected data by a set of models, and/or can be otherwise suitably used. Additionally or alternatively, the computing system can restrict various components to operate within particular (manufacturer specified) temperature ranges. As an example, the housing can include a first thermal region (e.g., lower interior cavity; lower enclosure; a first example is shown in FIG. 6, a second example is shown in FIG. 13), housing a set of components configured to operate below a temperature threshold (e.g., below 60 degrees C.), and a second thermal region (e.g., upper interior cavity; upper enclosure; a first example is shown in FIG. 6, a second example is shown in FIG. 13), housing a set of components configured to operate above the temperature threshold (e.g., above 60 degrees C.; below a second temperature threshold which is greater than the first temperature threshold, such as 80 degrees C.).

However, the system can include any other suitable set of sensors.

The plurality of LEDs functions to provide an independent light source (e.g., independent of the ambient lighting) and/or facilitate substantially homogeneous illumination of a target plane (and/or rectangular region thereof; such as an imaging region of the perception sensors). Additionally or alternatively, the plurality of LEDs can provide supplemental, high-intensity lighting which can mitigate variability of ambient lighting conditions. For example, the LEDs can cooperatively provide illumination which is about 3× brighter than the sun, such that 25% or less of the incoming photons are provided by the sun under the maximal ambient lighting (e.g., resulting in a maximum lighting variance of about 25% from the maximum intensity lighting condition under variable ambient sunlight). Accordingly, the LEDs may reduce the sensitivity to ambient lighting factors (e.g., daylight vs darkness; cast shadows; light color and/or color temperature; etc.).

The LEDs can have a color temperature of: less than 1000K, 1000K, 2000K, 3000K, 4000K, 5000K, 6000K, 8000K, 10000K, greater than 10000K, any open or closed range bounded by the aforementioned values, and/or any other suitable color temperature. For example, LEDs can be selected with the highest lumen output per unit power (e.g., instead of trying to optimize for wavelength vs. the sun, since the sun shifts color over time of day)—LEDs may be selected in the target range of 4000K to 5000K to maximize efficiency. The LEDs are preferably operated with a pulse duration (e.g., synchronized with image capture) of less than 10 μs, 10 μs, 20 μs, 30 μs, 50 μs, 100 μs, 150 μs, greater than 150 μs, any open or closed range bounded by the aforementioned values, and/or any other suitable pulse duration. For example, LED strobe duration can be software-controlled, with a fixed hardware-regulated intensity (via closed-loop current flow). The LEDs can individually or collectively have an illumination intensity of: less than 50 k lux, 50 k lux, 100 k lux, 150 k lux, 200 k lux, 220 k lux, 250 k lux, 270 k lux, 300 k lux, 320 k lux, 350 k lux, 400 k lux, greater than 400 k lux, any open or closed range bounded by the aforementioned values, and/or any other suitable illumination intensity. The LEDs can individually or collectively utilize any suitable amount of power, such as: greater than 1000 Watts (W) (e.g., 1100 W, 1200 W, 1300 W, between 1000-1500 W, etc.), greater than 1500 W, greater than 2000 W, less than 1000 W (e.g., 500 W, between 500-1000 W, etc.), and/or any other amount of power. However, LEDs can have any other suitable lighting characteristics.

Figure 14:
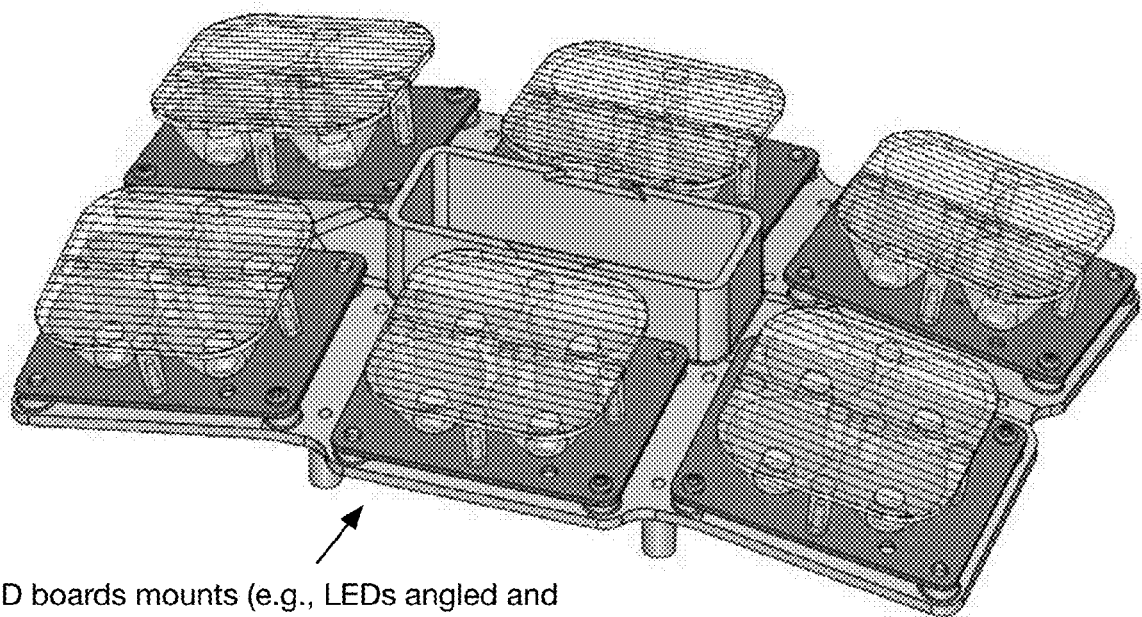
FIG. 14 is a trimetric view of an example of an array of LED modules in a variant of the system.

The LEDs are preferably mounted on a set of angled platforms (e.g., an example is shown in FIG. 14, having a non-zero angle relative to a horizontal plane, having a non-zero angle relative to a vertical plane, having non-zero angles relative to each other, etc.), which orient the LEDs such that the emitted light strikes the target reference plane (e.g., ground plane) in a rectangular aspect ratio (e.g., which substantially matches the camera's field of view). Additionally or alternatively, the light can strike the reference plane in a variable shape, in another predetermined shape (e.g., square), in any suitable size, with particular direction and/or orientation characteristics (e.g., orthogonal to the soil bed/ground), and/or in any other suitable manner. The camera module can optionally be configured to image the same area that is illuminated (e.g., through physical masks or filters, through software masks or filters, etc.).

LEDs can be mounted individually (e.g., each having a central axis with a unique orientation relative to a gravity vector and/or central axis of a camera) and/or arrayed (e.g., groups of LEDs mounted with the same orientation; 1D or 2D arrays; 2×2 array; etc.). The LEDs are preferably arranged peripherally outward of perception sensors at the same end of the housing (e.g., bottom side; surface normal substantially aligned with a gravity vector and/or oriented towards the ground; encircling and/or surrounding the perception sensors, mounted radially outward of the perception sensors relative to a central axis of the housing), but can be otherwise arranged. As an example, the plurality can include 24 LEDs which are arranged peripherally outward of a set of perception sensors (e.g., camera) and/or lenses thereof (e.g., radially outward of a central axis of a camera lens).

In one variant, six LED platforms (e.g., each mounting 4 LEDs, such as in a 2×2 array) can be mounted at distinct angles (e.g., relative to each other, relative to an inferior broad surface of the housing, non-parallel with respect to each other, non-parallel with respect to an inferior broad surface of the housing, etc.) to project a rectangular pattern on the target plane (e.g., ground plane).

Figure 15A:
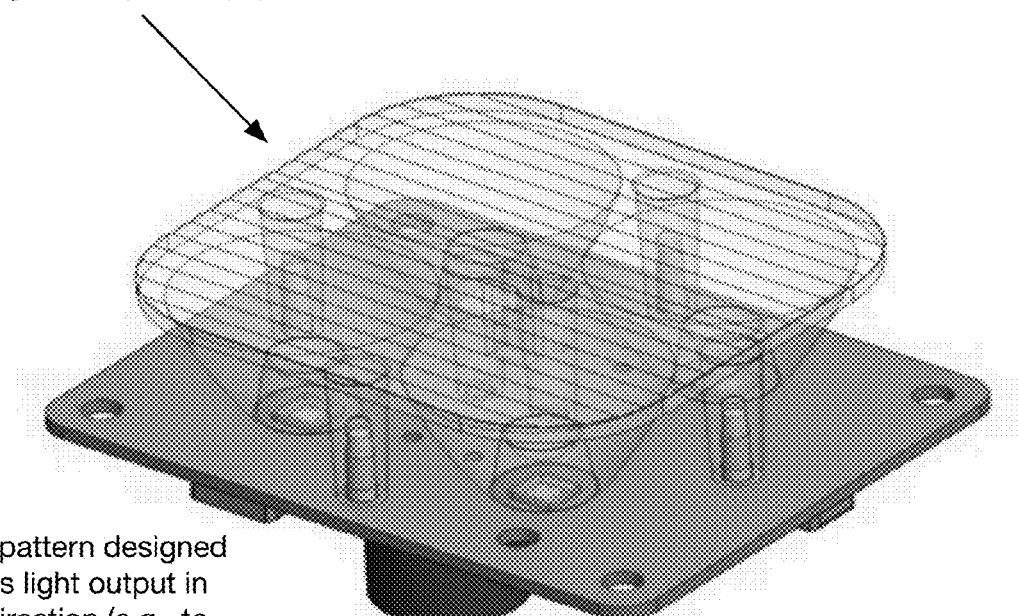
FIGS. 15A-15B are an isometric view and side view, respectively, of an LED module in a variant of the system.
Figure 15B:
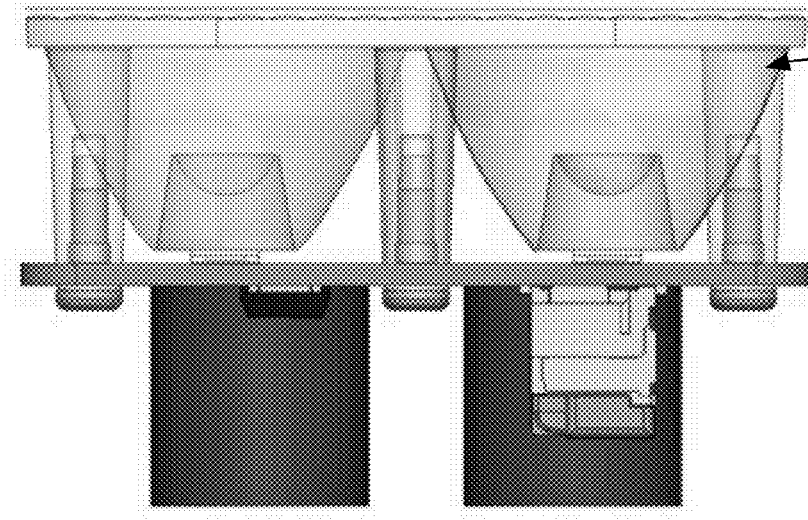

LEDs can be used with a lens covering, which can be used to bias the light output shape/pattern (e.g., an example is shown in FIG. 15B; mounted with an LED array and angled with the LED platform). In variants, LEDs outputs can be biased towards a particularly shaped (e.g., rectangular, square, etc.) light pattern using a lens. For example, the surface of the lens can be rippled (e.g., wavy; cycloid surface cross section, curate trochoid cross sections, series of bumps in each cross section, etc.; an example is shown in FIG. 15A and FIG. 15B) and/or can include a series of ridges/bump which bias the light output towards a particular shape (e.g., where the curvature of each bump and/or surface profile is selected by a ray tracing optimization for a rectangular target, etc.).

The LED output illumination is preferably biased towards a rectangular shape (e.g., on a target reference plane), but can have any other suitable output illumination geometry (ies). Additionally, the LED output illumination is preferably substantially homogeneous (e.g., intensity variance of less than: 50%, 20%, 10%, 5%, 2%, 1%, 5%, etc., evaluated per pixel, square millimeter, etc.; homogeneous).

LEDs can be packaged individually, within LED modules, and/or otherwise integrated within the housing.

However, the system can include any other suitable LEDs, lighting modules, and/or lighting component(s).

The computing system functions to detect and/or track a set of plants. Additionally or alternatively, the computing system can function to control a set of actuators (e.g., of a farm implement; examples are shown in FIG. 5 and FIG. 11) based on the plant detections. Additionally or alternatively, the computing system can function to automatically control the LEDs and/or (active) thermal components to facilitate operation of the system. The computing system can include: a gateway computer, a lighting control module, an object detection module (e.g., including a set of models), an actuator control module, and/or any other suitable set of elements. In one example, the computing system can include a first ('gateway') board, which manages I/O communications and timing, and a second ('central compute') board which performs perception, control, and local communications (e.g., receives sensor data from the set of sensors, controls LEDs, controls thermal components, etc.). However, the computing system can alternatively be centralized, distributed, and/or otherwise integrated with any suitable set of components/boards within the housing.

Examples of farm implement capabilities can include, but are not limited to: weeding, harvesting, spraying, tilling, pest control, fertilization, a combination of capabilities, and/or any other suitable uses.

For example, the implement may be a pushed and/or pulled by a vehicle (e.g., a tractor) to facilitate one or more agricultural operations (e.g., weeding, crop data collection, pesticide/herbicide spraying, harvesting, etc.), and/or can be otherwise operated.

The computing system can include or be used in conjunction with one or more: CPUs, GPUs, custom FPGA/ASICS, microprocessors, servers, cloud computing, and/or any other suitable components. The computing system and/or processing thereof is preferably local (e.g., packaged within the housing; facilitating edge processing/compute), but additionally or alternatively portions of the processing can be remote, distributed, or otherwise separate from the system. For example, various post-processing, analytics, and/or mapping functions (e.g., which may or may not be executed in-the-loop with actuator control) can be executed via cloud computing or other remote processing. The computing system can include any suitable components to facilitate I/O (external) communication, data storage, camera injection, embedded vision, power regulation, precision control, low-level (internal) communication (e.g., between internal components of the system, etc.), and/or can include any other suitable components configured to provide any other suitable compute functionalities.

The computing system can be used for any or all of: communication, camera data collection, data storage, vision processing (e.g., embedded vision processing), and/or any other suitable processes.

In a first set of variants, the computing system can include, interface with, and/or implement a set of models, such as an object detection (and/or object tracking) model (e.g., YOLO, RCN, etc.), object classification model, localization model, and/or any other suitable set of models. The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), back-propagation, and/or otherwise generated. The models can be learned or trained on: labeled data (e.g., data labeled with the target label; examples are shown in FIGS. 8A-8F, FIG. 9, and FIG. 10), unlabeled data, positive training sets (e.g., a set of data with true positive labels, negative training sets (e.g., a set of data with true negative labels), and/or any other suitable set of data. In a specific example, models can be trained using historical data collected from the same camera pose/orientation (e.g., for a specific crop; from prior operation of the implement; etc.).

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

In one set of examples, the model can be a single-shot detector which is (pre)trained on datasets of images with a custom loss (e.g., enabling the object detection models to be tailored to the specific application, such as a specific crop and/or specific field arrangement; with maximized diversity in the data used to train our models; etc.). As an example, models can be trained with a hybrid supervised sampling method to build and update the datasets (e.g., oversampling hard edge cases with feedback from both operators in the fields and automatic images selection based on model detection). Models can be trained and tested on different use cases (e.g., edge cases, where finding crops among a high density of weeds may be most challenging). Additionally, the models can be implemented in conjunction with the MLops architecture using PyTorch, AWS, Weights & Biases, custom iterative tools, and/or any other suitable avenues.

However, the computing system can include any other suitable model(s).

In a second set of variants, non-exclusive with the first, the computing system can facilitate localization/tracking of crops based on the sensor data collected by the set of sensors, such as utilizing one or more of: SLAM, odometry, triangulation/trilateration, dead-reckoning, and/or any other suitable techniques. For example, the computing system can be configured to generate and/or update a map of meristem locations for crops within a field (e.g., with plants individually indexed, such as with a plant identifier; which can be used to analyze data/information for the field granularly, at the plant-level, and/or coarsely, at a row-level or field-level).

In some examples, for instance, the computing system can implement a visual odometry process (e.g., utilizing a stereo camera, utilizing a depth sensor, etc.), which can include any or all of: detecting a height of the system relative to the ground (e.g., distance between soil bed and system); detecting a speed of movement of the system and/or farm implement to which it is coupled (e.g., through tracking detected features between frames); and/or any other processes.

Additionally or alternatively, the computing system can evaluate one or more trained models (e.g., machine learning models to track features between frames), such as to: replace the visual odometry process, supplement the visual odometry process; and/or be otherwise suitably used.

In a third set of variants, the computing system can include an actuator controller which is configured to automatically control an actuator (e.g., hydraulic actuator, electrical actuator, rotary actuator, linear actuator, 2D actuators, 3D actuators/linkages, etc.; blade weeders, finger weeders, knife blades, etc.) based on the plant-level detection/tracking. As an example, the controller can control a blade actuator to open and close a pair of blades around a plant to facilitate mechanical weeding around the plant, based on the detected plant location. As a second example, the actuator can be an actuator of a weeder implement, such as a crimper, roller, hoe, disc, tine, blade, and/or any other suitable type of weeder. As a third example, the actuator can be configured to perform: weeding, spraying (e.g., dispersal of a crop protection chemistry, NPK fertility distribution, solid dispersal, liquid/droplet dispersal, etc.), harvesting, pest and disease control, and/or any other suitable implement functionalities. The actuator controller can additionally include power regulation components (e.g., where the actuator controller receives dirty/unconditioned power from a vehicle) and/or can include any other suitable signal/power conditioning equipment and/or otherwise facilitate precision actuation/control of any other suitable components.

In a fourth set of variants, the computing system can perform plant-level analytics of a line of crops. For example, the computing system can perform all or a portion of the method(s) and/or analyses as described in U.S. application Ser. No. 16/539,390, filed 13 Aug. 2019, which is incorporated herein in its entirety by this reference.

However, the system can include any other suitable computing system.

The computing system is preferably connected to at least one input-output (I/O) port and/or integrated via at least one I/O connection, which can connect the computing system to an implement (and/or other systems, such as a vehicle, implement actuator, etc.) via a set of connectors. For example, the set of ports can enable the computing system to participate in networked vehicle communications (e.g., CAN bus), inter-module communications (e.g., for timing/synchronization, collective actuation, etc.; via CAN or another protocol), receipt of external sensor feedback (e.g., from implement sensors, such as an encoder, GPS antenna, etc.), actuator control, and/or can provide any other suitable I/O connections/communications. For example, the set of I/O ports and/or I/O connections can enable various protocols and/or communication channels, such as CAN, LIN, Ethernet, etc.; and/or can provide any other suitable power/data connections to any other suitable components/endpoints.

In one variant, the I/O port (and/or I/O connector thereto) can be monolithic (e.g., where all external power and/or data can be received via a single connection, which may reduce the integration burden); alternatively, there can be multiple I/O connections and/or separate power/data connections to various endpoints, and/or the computing system can be otherwise connected to any other suitable endpoints (e.g., wirelessly via Bluetooth, WiFi, RF signals, etc.).

In another variant, non-exclusive with the first, the system can include one or more FAKRA connectors (or other robust coaxial connectors) for communication (e.g., analog and/or digital communication, RF communication, etc.), which can confer benefits of any or all of: mechanical rigor, high-frequency data transmission, high performance, an ability to withstand harsh environmental conditions (e.g., rain, moisture, high temperatures, etc.), and/or any other benefits.

As an example, the I/O port(s) can be located on a side(s) of the housing (e.g., between a first end, with the LEDs and perception sensors, and a second end opposite the first end, with a thermal component such as a heat sink) and extend through a thickness of the housing. In a second example, the I/O ports can be connected to a gateway computer (or gateway board) within a sealed interior of the housing. Alternatively, I/O ports can be connected to any other suitable processors and/or system components. However, the I/O ports can be otherwise suitably arranged.

However, the computing system can be otherwise suitably integrated with and/or connected to any other suitable components/endpoints.

Figures 2A, 2B:
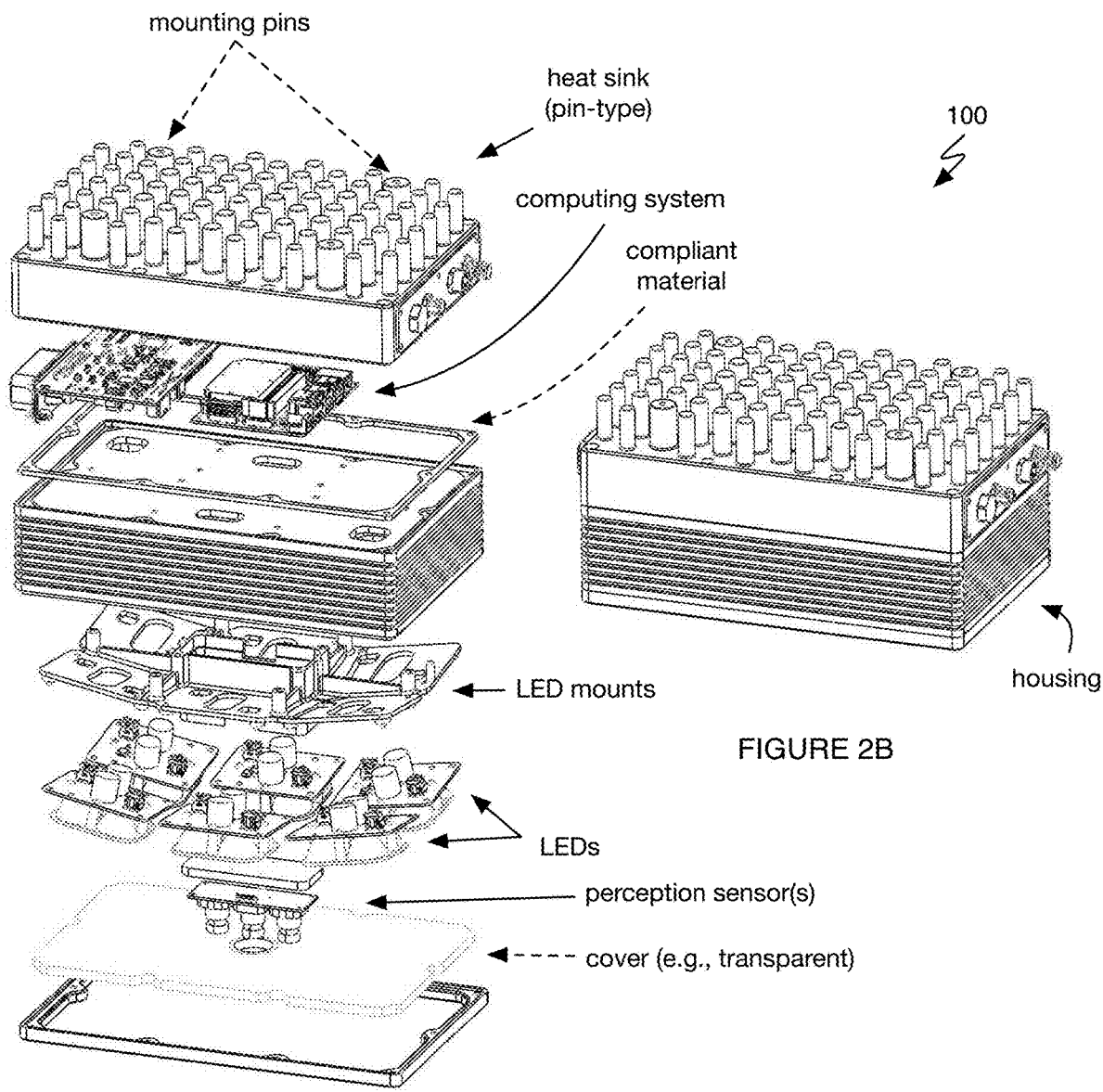
FIGS. 2A and 2B are an exploded view and an assembly view of a variant of the system, respectively.
Figure 3A:
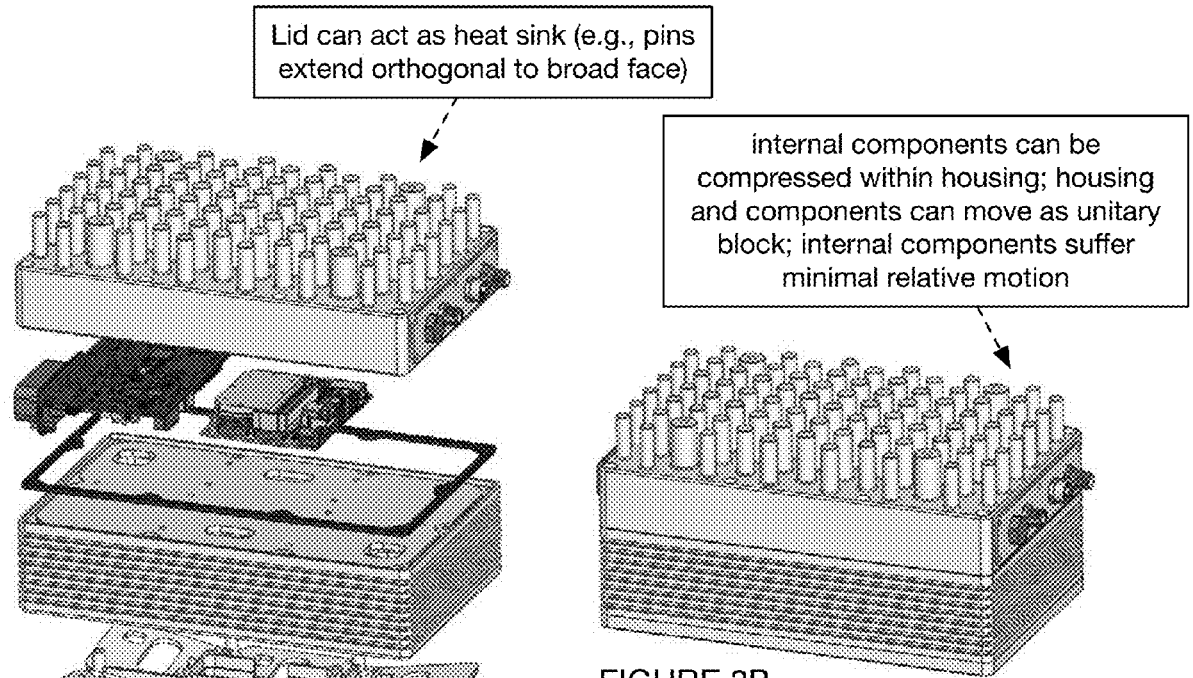
Figure 3A:
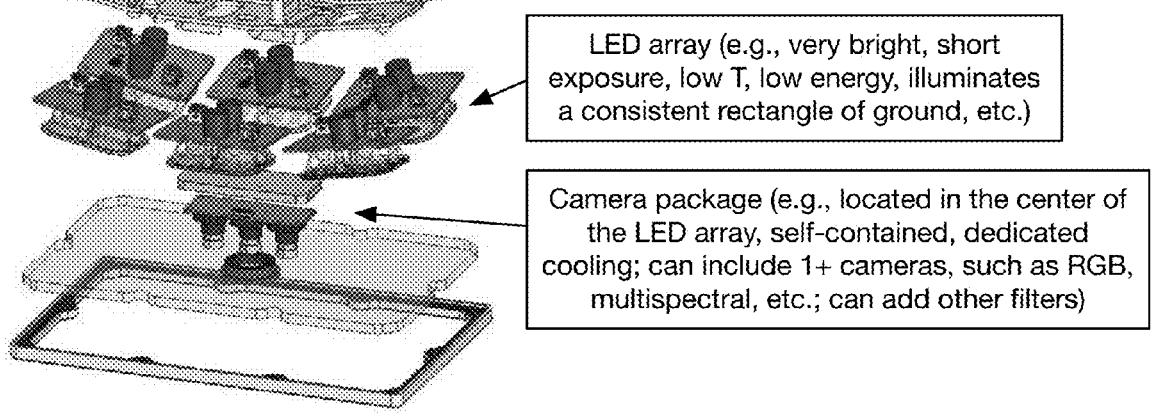

The housing (e.g., an example is shown in FIGS. 2A-2B and FIGS. 3A-3B) functions to enclose and structurally support the computing system, sensors (e.g., camera and/or other perception sensors), and/or LEDs. Additionally or alternatively, the housing can function to provide protections to system components, which can include ingress protection (e.g., fluid isolation and/or dust particulate isolation), vibration damping (or shock isolation), electrical insulation/isolation, thermal protections (e.g., thermal fluid separation and/or thermal separation of a first and second region), and/or any other suitable system protections. For example, the housing can be sealed to provide an ingress protection which can be: IP65+, IP67+, IP69+, IP69 k, and/or can provide any other ingress protection(s). As a second example, the housing can be mounted on a set of shocks or vibration dampers (e.g., urethan shocks). For example, the system can be top mounted at a set of heat sink pins (e.g., an example is shown in FIG. 2A), each compressed against a urethane damper (or vibration isolator). Additionally, components can be compressed the interior to reduce propagation of low frequency impulses to components within the enclosure; elements can be compressed within the interior and/or supported by compliant clamps/mounts to further mitigate vibration propagation to components within an interior of the housing (e.g., an example is shown in FIGS. 2A and 3A-3B; cables within the interior can be compliant to reduce/mitigate the effects of cyclic vibration/loading).

Figure 4:
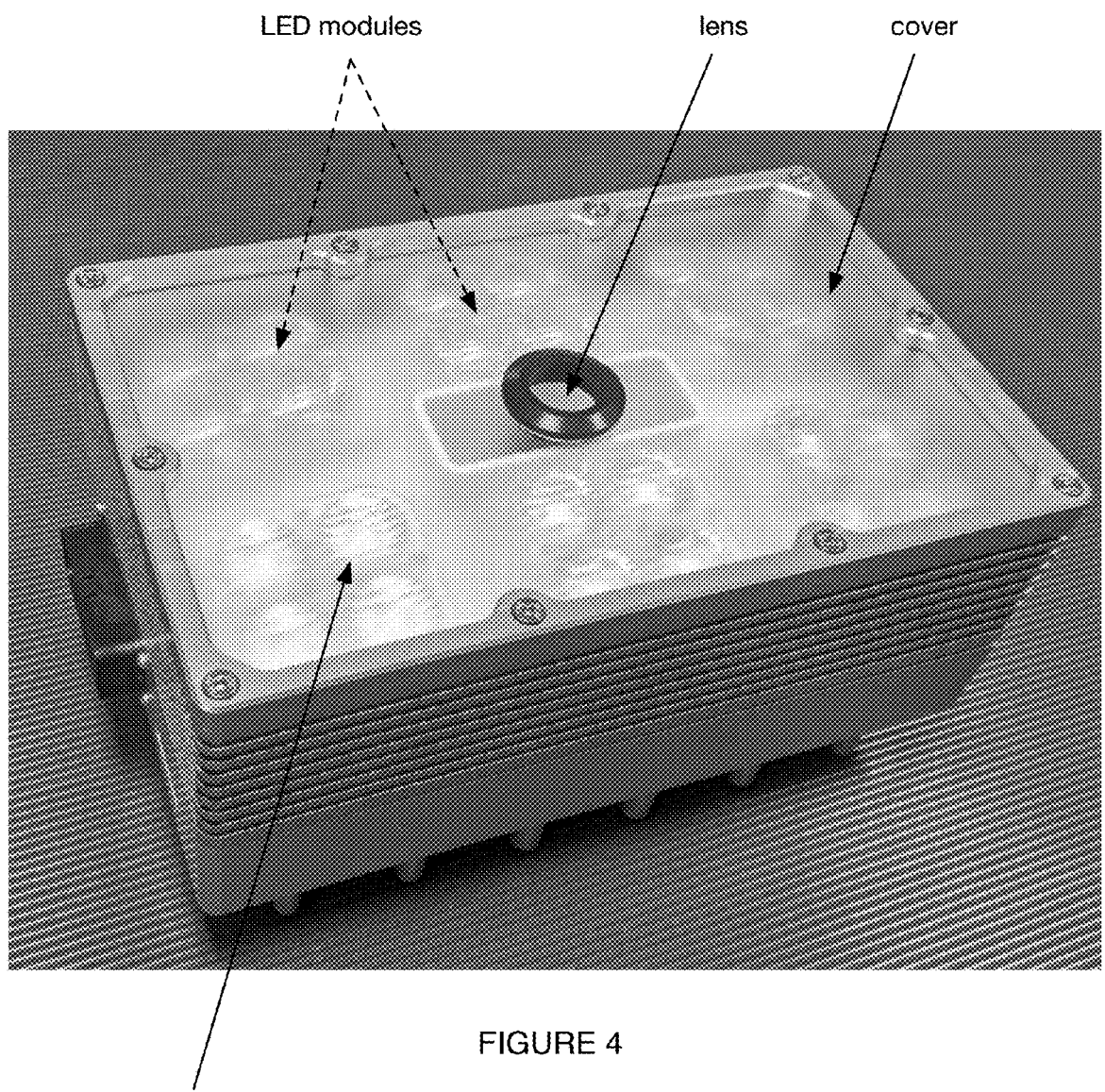
FIG. 4 is a trimetric image of a variant of the system, showing an underside of the system.

The computing system, perception sensors, and LEDs can be mounted within an interior of the housing, with the computing system arranged opposite the perception sensors and LEDs (e.g., across a thickness of a thermal component; with the computing system adjacent to an upper heat sink and/or shroud). For example, the LEDs and perception sensors can be arranged proximal to a first end of the housing (e.g., bottom end) and the computing system (and/or a processor thereof) can be arranged proximal to a second end of the housing, opposite the first. More preferably, the perception sensors and LEDs are optically/visually connected to the ambient environment through a thickness of the housing (e.g., via a set of lenses and/or a transparent/translucent cover (e.g., an example is shown in FIG. 4); facilitating photon transmission through a thickness of the housing) at the first end; and the computing system is thermally connected to the environment through a thickness of the housing (and/or an integrated heat sink thereof) at the second end.

The housing is preferably constructed from an aluminum body (e.g., or another high-thermal conductivity material), but can additionally or alternatively include: polymers (e.g., rubber gaskets), elastomeric/polymer compliant structures, plastics (e.g., thermoplastics; injection molded, cast, extruded, formed, etc.), metals (e.g., alloyed or unalloyed; steel, copper, etc.), glass, polycarbonate, material coatings (e.g., lens coatings; metal coatings: electroplated, anodized, powder coated, galvanized, painted, etc.), lenses, covers, filters (e.g., cut filter for light receipt, such as a 600 nm filter for a stereo camera; high pass, low pass, band pass, etc.), shrouds (e.g., sun shroud; an example is shown in FIG. 1), thermal fins (e.g., integrated into the body of the housing; heat sink mounted to the housing and thermally connected to the housing; etc.), and/or other suitable materials/components. Additionally, the body of the housing can include one or more integrated: I/O port (e.g., power and/or data connections), valves (e.g., GORE® PolyVent filter, fluid vent, etc.), thermal components (e.g., heat sink; thermal fins; etc.), optical lenses/filters/covers, and/or other components. The housing is preferably a multibody assembly of components which are compressed (e.g., with a set of fasteners/clamps) to define a unitary, sealed enclosure, but can alternatively house multiple enclosures (e.g., for distinct thermal regions; independently cured and/or sealed) and/or can be otherwise suitably assembled/constructed (e.g., epoxy seals, adhesive attachment, etc.). For example, the perception sensors (e.g., a camera module) and/or lighting modules can be sealed within an independently cured/sealed enclosures. Additionally or alternatively, the camera module can include and/or the housing can define a set of camera lenses configured to repel or enable removal of moisture that might obscure the camera. In a first set of examples, one or more camera lenses is configured with a hydrophobic coating (e.g., external hydrophobic coating). In a second set of examples, non-exclusive with the first, one or more camera lenses is configured with a piezoelectric element (e.g., configured as a piezoelectric coating) integrated with (e.g., inside) and/or coupled to one or more camera lenses that vibrates (e.g., buzzes at 60 kHz) the lens, wherein the vibration can repel/remove liquid (e.g., condensation, moisture, etc.) from the lens. In a third set of examples, non-exclusive with those above, a thermoelectric cooler of the thermal management subsystem (e.g., as described below) can be selectively turned on (e.g., with a delay relative to the starting of the remaining system) to delay and/or prevent the formation of condensation on the lens(es). In a fourth set of examples, non-exclusive with those above, a bipolar thermoelectric cooler can be utilized which can selectively heat a cavity containing the optical sensor(s) to remove condensation.

However, the system can include any other suitable housing.

The set of thermal components functions to thermally condition an interior(s) of the housing and/or components therein to facilitate operation of system components (e.g., cameras, processors, LEDs, etc.; which may be sensitive to variation in temperature and/or humidity, which may be sensitive to extreme temperature and/or humidity, etc.). Additionally, thermal components can facilitate heat rejection to an ambient environment. Thermal components can include: active thermal components (e.g., which utilize input energy, such as electrical energy, to drive a thermodynamic process and/or heat transportation; forced convection across a heat sink using a powered fan; refrigeration systems; thermoelectric coolers, etc.), passive thermal components (e.g., passive heat sinks; thermal insulation; etc.), heat sinks, thermal insulation, thermal interface materials (TIMs), refrigeration devices, heat pumps, and/or any other suitable thermal components.

Figure 12:
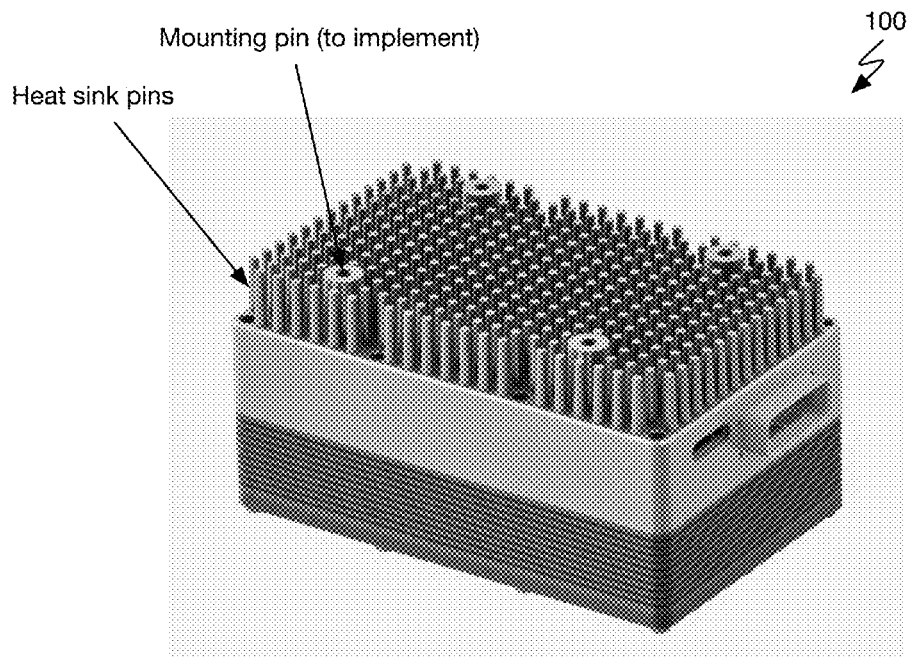
FIG. 12 is a trimetric representation of a variant of the system.

In a first set of variants, the set of thermal components can include a heat sink, which functions to reject heat from the system into the ambient environment. The heat sink is preferably passive (e.g., rejecting heat by radiation, natural convection and/or ambient airflow convection), but can additionally or alternatively be fan-driven (e.g., ducted/non-ducted fan; heat rejection by forced convection), at least partially shrouded, and/or otherwise configured. Additionally, the heat sink may facilitate heat rejection into a mounting structure and/or external frame (e.g., where the heat sink is mounted to an implement frame). The heat sink is preferably integrated into a body of the housing, but can additionally or alternatively be mounted to the housing and thermally coupled to the housing (such as via thermal paste, thermal grease, thermal gap filler, TIM, etc.). In one example, the heat sink can include a plurality of pins (e.g., cylindrical; conical frustum, etc.) extending orthogonal to the housing, such as from the second end, which may be advantageous (e.g., when compared to other fin types, such as straight fins) under omnidirectional ambient airflow (e.g., such as may be experienced when mounted to a farm implement and/or under variable ambient wind conditions; an example is shown in FIG. 5). Pins can be offset in square packing arrangement (e.g., with each central axis at the intersection of a regular grid; an example is shown in FIG. 12), hexagonal packing arrangement (e.g., where the array of pins defines a set of interior pins surrounded by a set of peripheral pins, with each interior pin substantially equidistant to six adjacent pins; an example is shown in FIG. 3B), and/or otherwise patterned or arranged. However, the heat sink can include any other suitable fins and/or fin geometries (e.g., straight, flared, etc.). However, the set of thermal components can include any other suitable heat sink(s).

In a second set of variants, nonexclusive with the first, the set of thermal components can include a fluid manifold connected to an external cooling system, such as a fluid chiller and/or refrigeration system onboard an implement (e.g., a central cooling system, which may be connect to a plurality of modular housings in any suitable combination of series/parallel).

In a third set of variants, nonexclusive with the first and second, the set of thermal components can include a thermoelectric cooler [TEC] configured to maintain a temperature gradient between a first region (and/or first end) of the housing and a second region (and/or second end) of the housing. For example, the first and second regions can be at least partially thermally separated/insulated by a body of the housing and/or separated by a body of the TEC; the first and second regions coupled to the first and second sides of the TEC, respectively, wherein the TEC can configured to transfer heat from the first side/region to the second side/region (e.g., dynamically controlled by the computing system based on the temperature of the first side). As a second example, the TEC can be thermally coupled to a perception module and/or a perception sensor (e.g., camera) thereof, wherein the TEC can cool the perception module relative to a remainder of the housing. As a third example, the TEC can be configured to maintain the first region and/or a camera therein below a predetermined temperature threshold (e.g., 60 degrees Celsius, 50-70 degrees Celsius, 40-60 degrees Celsius, etc.) and/or to maintain the second region (e.g., containing processors) below a different predetermined threshold (e.g., 80 degrees Celsius, 70-90 degrees Celsius, 60-80 degrees Celsius, etc.).

The thermoelectric cooler can be configured to: transfer heat between cavities (e.g., from 1 cavity to the other); from a cavity to an exterior of the housing (e.g., wherein the TEC is connected to a set of conductors that connect to a plate located outside of the housing); between a combination of locations; and/or can be used in any other suitable ways.

In some variants, a thermal component (e.g., heat sink, such as a pin-type heat sink) can be integrated with the body of the housing and configured to structurally mount the system at a first end (e.g., top-mount heat sink).

However, the system can include any other suitable set of thermal components and/or other thermal management system(s).

The system can optionally include a set of valves which function to reject water (vapor/humidity) from the sealed interior of the housing. For example, the valves can include a unidirectional membrane configured to passively vent moisture (i.e., water vapor) from the housing interior. Additionally or alternatively, the system can include any other dehumidification elements, filters, and/or ventilation components. In a specific example, the system can include one or more GORE® PolyVent filter(s) (e.g., at each independently sealed enclosure, etc.) extending through a thickness of the housing and configured to vent (interior) vapor/moisture to ambient. However, the system can alternatively exclude the set of valves and/or can otherwise facilitate dehumidification and/or fluid ventilation from the housing.

However, the system can include any other suitable components.

4. Method

Figure 18:
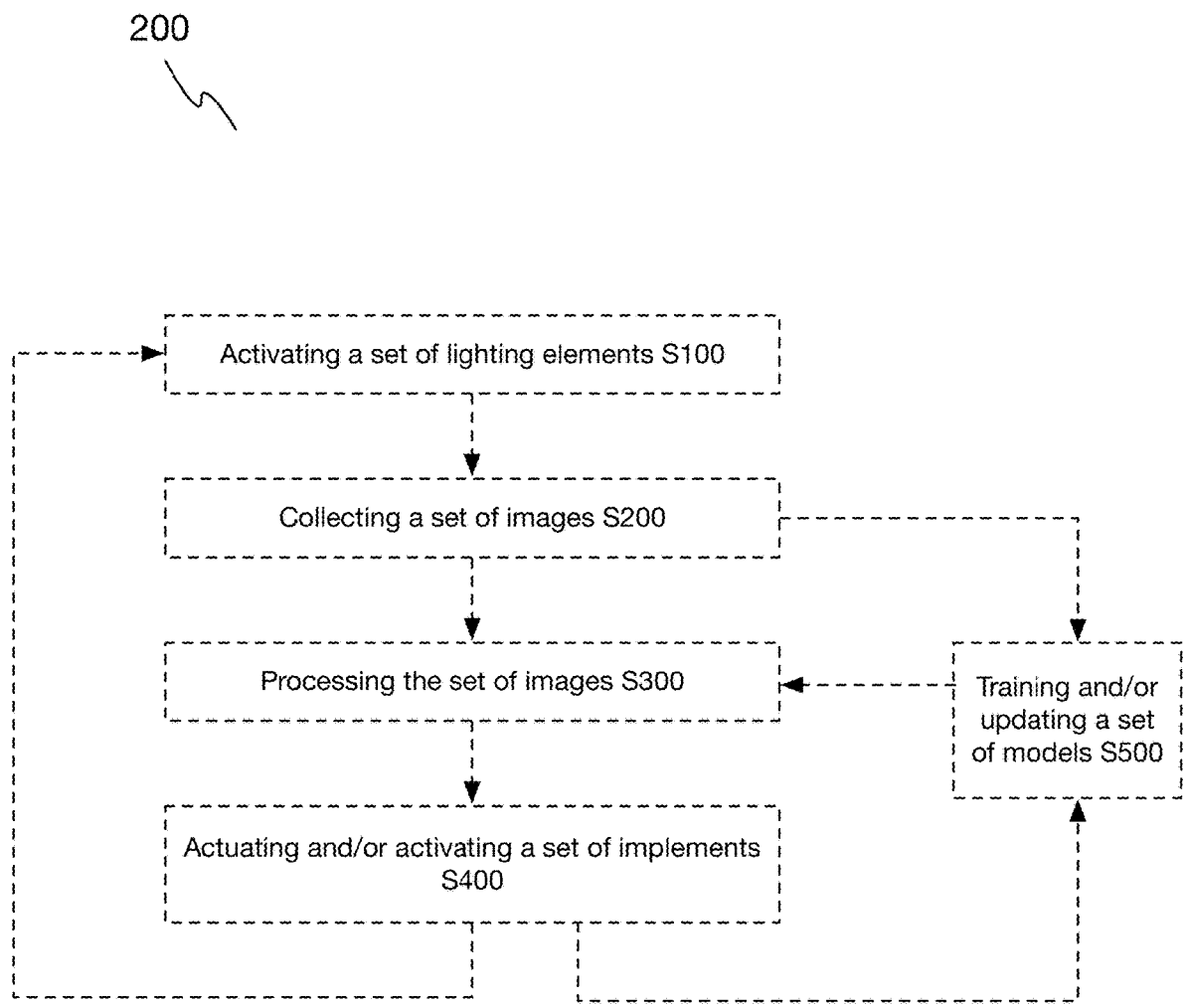
FIG. 18 depicts a variant of a method.

As shown in FIG. 18, the method 200 for crop detection can include any or all of: activating a set of lighting elements S100; collecting a set of images S200; and processing the set of images S300. Additionally or alternatively, the method can include any or all of: actuating and/or otherwise activating a set of implements S400; training and/or updating (e.g., retraining) a set of models used in processing the set of images S500; and/or any other suitable processes. Further additionally or alternatively, the method 200 can include any or all of the processes as described in U.S. application Ser. No. 16/267,362, filed 4 Feb. 2019; U.S. application Ser. No. 16/539,390, filed 13 Aug. 2019; U.S. application Ser. No. 17/100,773, filed 20 Nov. 2020; and U.S. application Ser. No. 17/079,251, filed 23 Oct. 2020; each of which is incorporated herein in its entirety by this reference.

Any or all of the method can be repeated (e.g., at a set of intervals, at predetermined frequencies, in response to triggers, continuously, etc.), such as throughout the use of an implement. Alternatively, any or all of the method can be performed a single time, not at all, and/or otherwise performed.

S100 and S200 can be performed: contemporaneously (e.g., at the same time, at overlapping time intervals, etc.) such that the images are taken while the lighting elements are activated; in response to a trigger; according to a schedule (e.g., predetermined frequency); and/or at any other time(s).

In variants of the system including multiple optical sensors (e.g., multiple cameras), the optical sensors can be: triggered at the same time, triggered at different times, triggered with different levels of exposure (e.g., such that the middle camera is exposed longer as it receives the least light in embodiments where the LEDs surround the optical sensors) and/or other parameters, triggered with the same parameters, and/or otherwise suitably triggered.

In variants including multiple systems (e.g., multiple housings each coupled to a different actuator/arm of the implement), the lighting elements can be triggered in a non-overlapping fashion with respect to each other (e.g., to not affect the amount of lighting from nearly LEDs). Alternatively, the lighting elements can be triggered simultaneously, at overlapping times, and/or in any other ways.

S300 can include: visual odometry (e.g., as described above); plant detection, localization, and/or characterization (e.g., as described above); occlusion and blur monitoring (e.g., as diagnostics for self-monitoring, to detect if a system failure has occurred and generate an alert, to detect a lens has been obstructed such as by condensation, etc.); calibration (e.g., for light uniformity); detection of doubles (e.g., two stems of the same crop); distinguishing between ground cover crops (e.g., living plant manure growing between plants and/or plant stems) and weeds and desired crops; disambiguating plants (e.g., determining whether a plant seen by different cameras and/or camera modules is the same or a different plant); and/or any other functionalities.

S400 can include: operating a blade, operating a sprayer, operating a tilling mechanism, and/or controlling parameters associated with any suitable implement(s).

S500 can include training one or more models, retraining one or more models (e.g., in response to an iteration of the method, at a predetermined set of intervals, etc.), and/or any other processes.

Additionally or alternatively, the method 200 can include any other suitable process(es) performed in any suitable order.

5. Variants

In variants, the system can include a set of hardware and software components configured to make farming implements ready for autonomy and plant-level precision for actuation. In particular, the system can enable targeted actions at the plant level—such as intra-row mechanical weeding of crops. It also captures agronomic data that can be used for strategic decisions. The hardware can bring together elements which may improve performance and reliability: high-quality camera sensors, lights specifically designed to compensate for the sun and remove the shadow, as well as advanced compute and control boards. These components are brought together in a robust, small, and lightweight enclosure that is easy to mount and integrate into equipment. The software can leverage AI and large training datasets (e.g., hundreds of millions of images) in order to enable accurate and reliable plant analysis in real time on this hardware.

Various examples of the method, system, and/or elements thereof are shown in FIGS. 2-12.

Variants can enable plant-level measurements: Individual plant species identification from a growing portfolio of crops (14+ today); New crop species can be added to the portfolio in 2 to 3 months depending on specific needs; Individual plant localization, including root detection; Individual plant size measurement (diameter, leaves count, etc.); Real-time processing directly on the machine enables decisions to be made in real-time at speeds (e.g., of the system, of the implement coupled to the system, etc.) up to 15 mph, greater than 15 miles per hour (mph) (e.g., between 0-25 mph, between 10-30 mph, etc.), and/or any other speeds. Commands can be sent to physical actuators for actions to be carried out in real-time; Enclosure and sensors can be built for extreme reliability (IP69) so that the system works in various environments.

Variants can enable plant-level insights: Real-time monitoring of the implement actions and the plants (e.g., via Teleoperations software made available to the equipment owner); Real-time monitoring of the system and the implement performance from the tractor cab; Data visualization and performance metrics post engagement (e.g., through a web API to access insights such as plant count, size distribution of plants in the field, speed and accuracy of the implement actions, etc.).

In variants (e.g., an example is shown in FIG. 3A; a second example is shown in FIG. 4), the module can include a custom LED array (e.g., very bright—such as 300,000 lux; short exposure; low T; low energy; illuminates a consistent rectangle of ground; etc.), which can be mounted to a curved surface on the bottom of the module.

In variants, the module can include a camera package (e.g., located in the center of the LED array, self-contained, optionally with dedicated cooling). The camera package can include one or more cameras (e.g., three), such as RGB, multispectral, thermal, and/or any other suitable cameras (e.g., with any suitable filters and/or lenses).

In variants, the system can facilitate heat rejection, such as where the module lid can act as a heatsink (e.g., pins sticking outward perpendicular to the lid plane; an example is shown in FIGS. 3A and 3B).

In variants, internal components can be compressed within the module housing (e.g., housing and components can move as unitary block so components don't suffer a lot of relative motion under vibration; urethane shock washers to prevent system level shock/vibration events from translating down the housing).

In variants, the electronics within the module can be robust and/or designed for use in heavy industry.

In variants, the box can be deployed without extrinsic calibration (e.g., where the lighting is relatively even within 20% of color accuracy and has an intrinsically calibrated lens/focus; pre-calibrated system may not need to be calibrated on install).

Various examples of a module are shown in FIGS. 2-7.

In variants, the system can be used with an agricultural implement which can be attached to and carried behind a tractor for performing some agricultural action. As an example, the agricultural implement can include mechanical actuators configured to move engaging tools based on control signals. In some variants, agricultural implements can include vision sensors and vision-based control systems, configured for performing mechanical actions with precision. In some variants, implement width can be increased to treat multiple crop rows. However, as the size of the implement increases, so does its weight and the weight of the tractor needed to pull the implement behind and use ground engaging tools (such as a mechanical weeder). This increased weight can cause soil compaction. In addition, as the width of the implement increases, there is an increased number of data communications required between actuators of the mechanical tools and vision-based control systems. These data communications can be performed over CAN or etherCAT networks, which may be bandwidth limited, and may impose speed constraints on the tractors (counteracting efficiency gains which may result from increasing the width of the implement). Alternatively, variants include vision-based agricultural implements with modularized elements which can increase the size, while keeping a reasonable weight and reducing the data (cross-)communication volume (e.g., where sensing and/or compute can be performed at the edge/modules).

Figure 7:
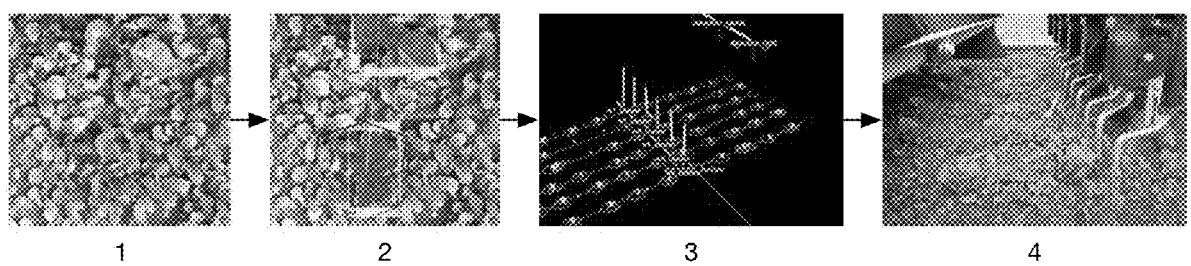
FIG. 7 is a diagrammatic example of one variant of the method.
Figure 8A:
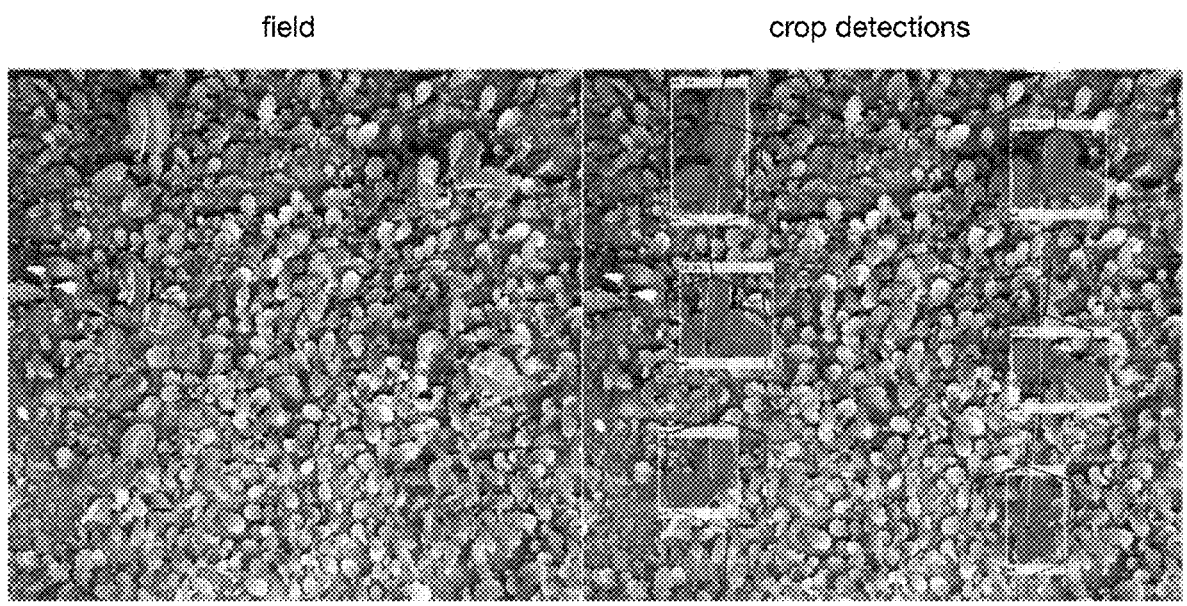
FIGS. 8A-8F are example outputs of the crop detection system for images of a field.
Figure 8B:
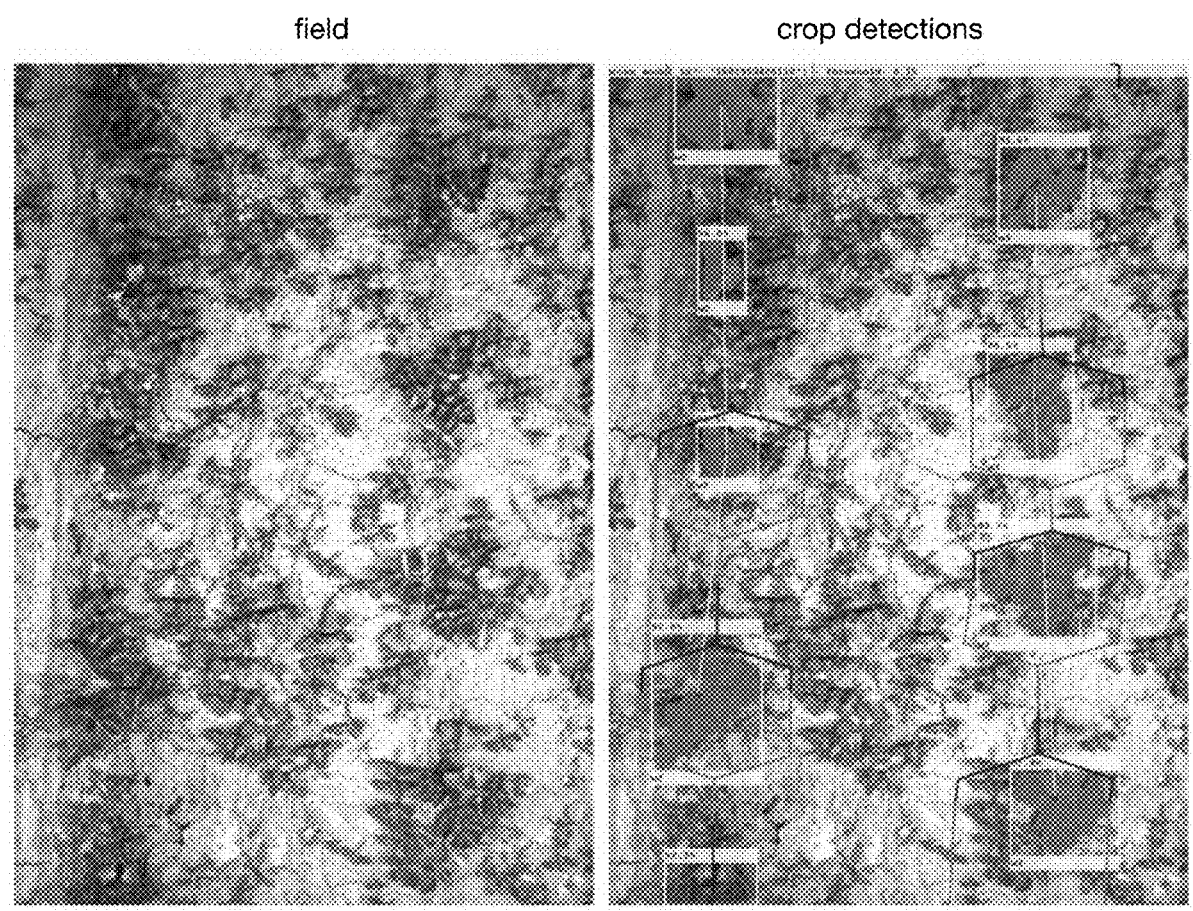
Figure 8C:
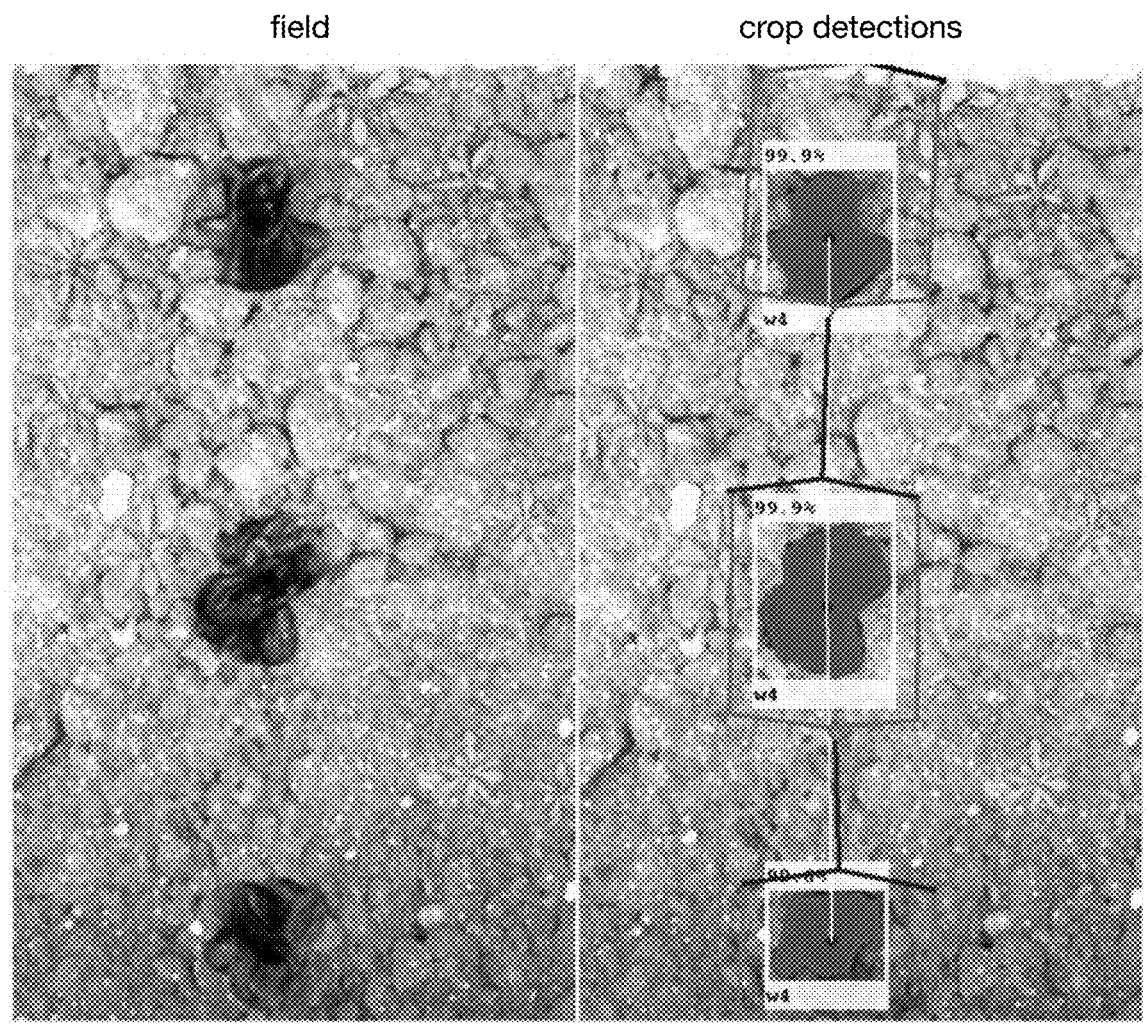
Figure 8D:
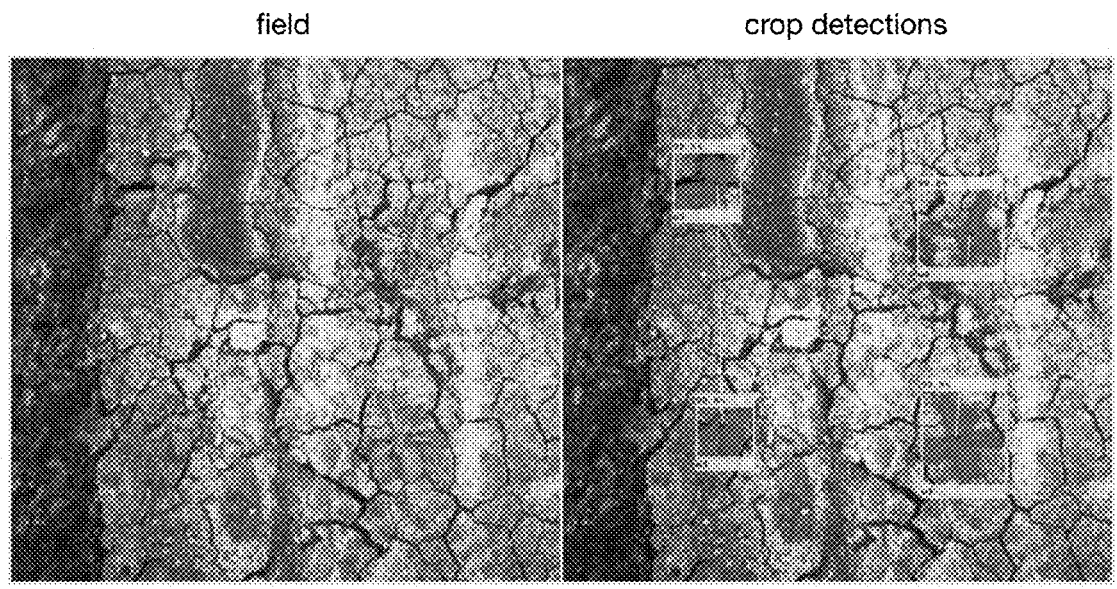
Figure 8E:
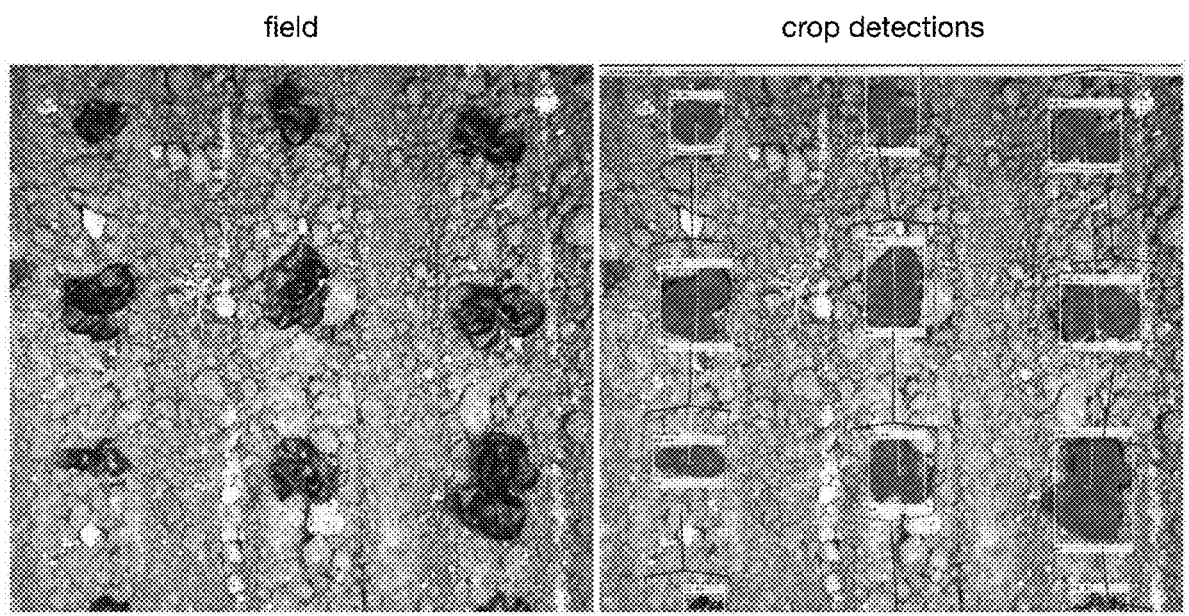
Figure 8F:
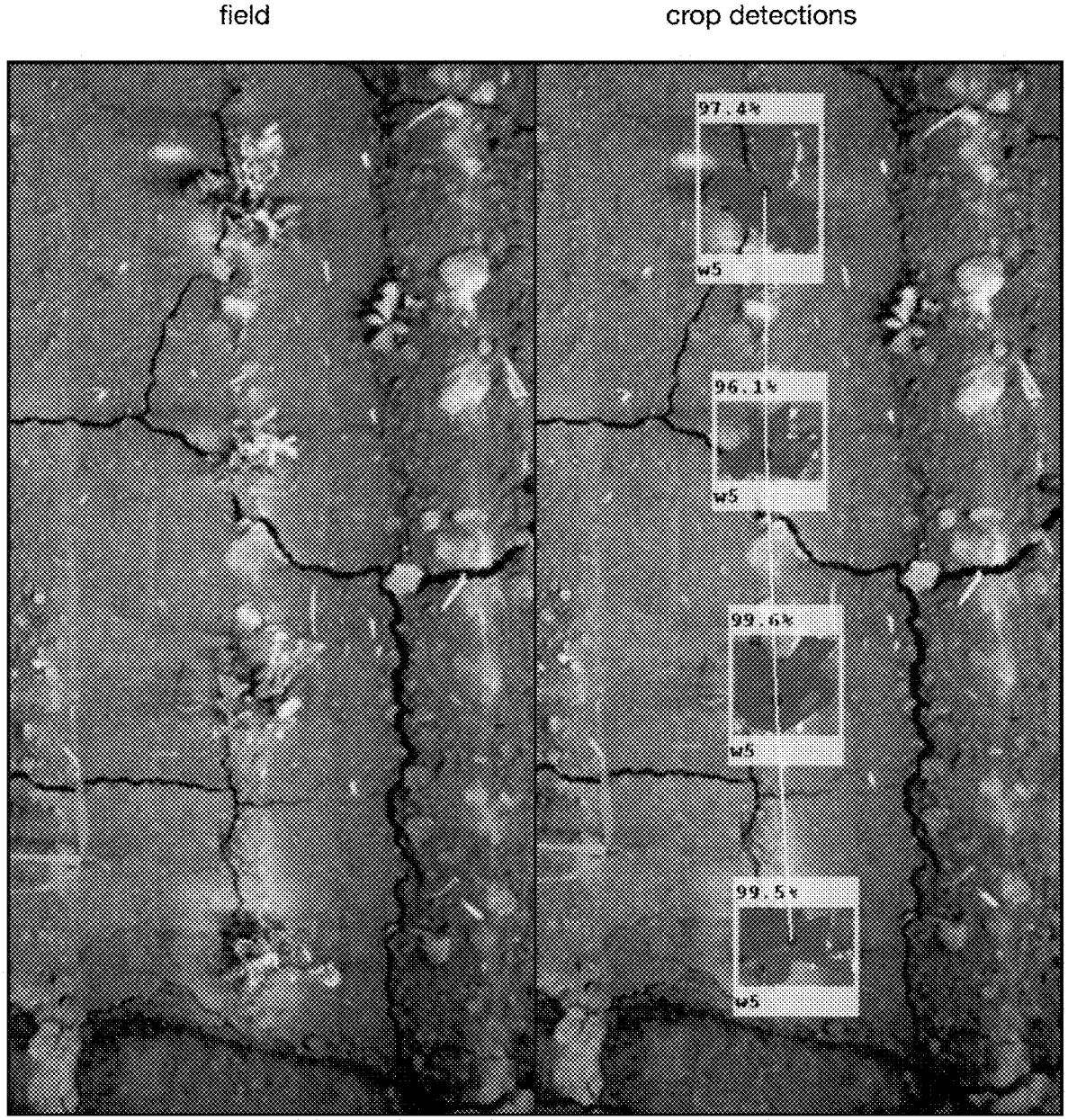
Figure 9:
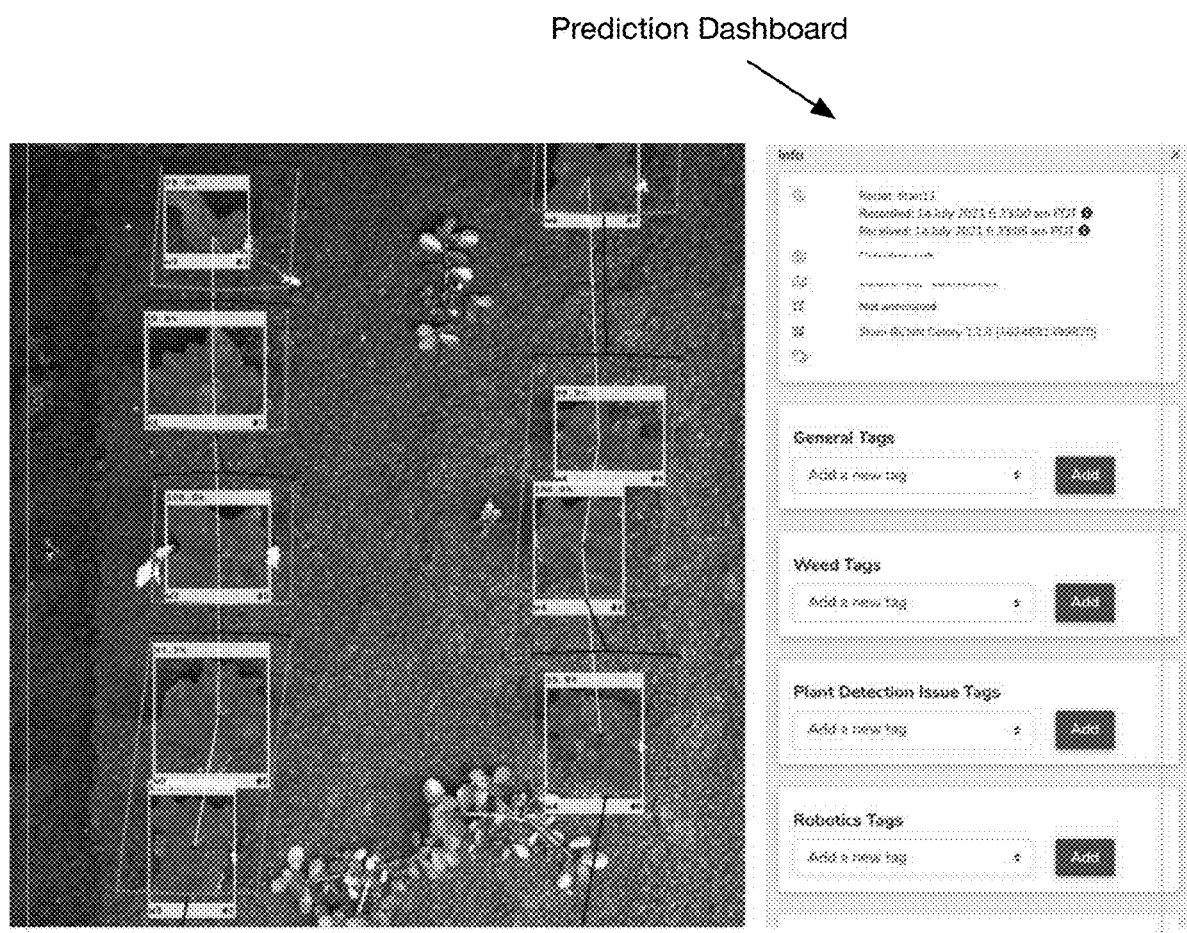
FIG. 9 is an example of a prediction dashboard for the system and/or method.
Figure 10:
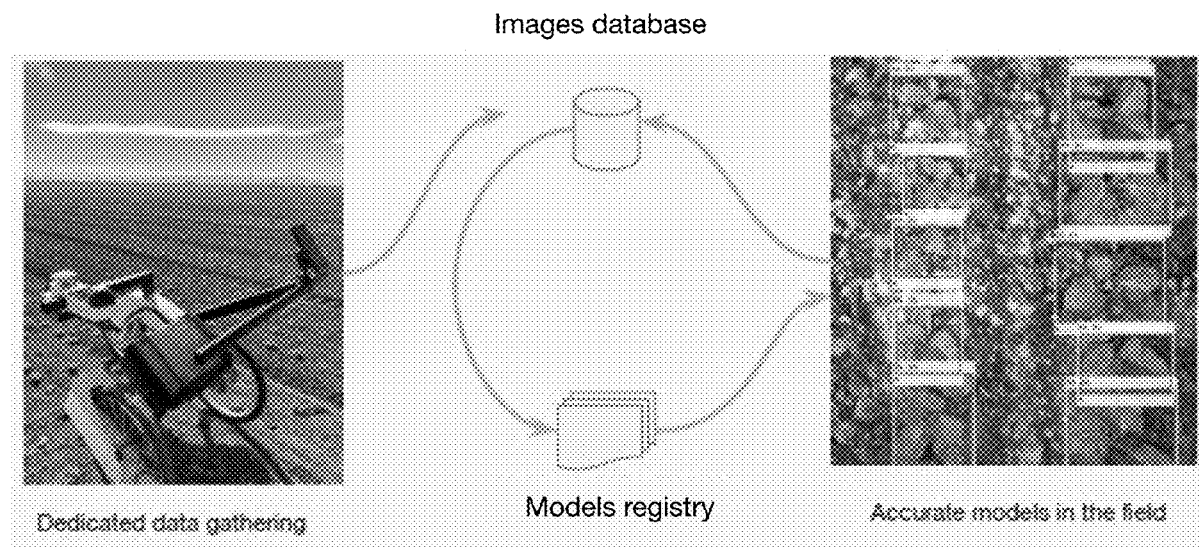
FIG. 10 is a diagrammatic representation of a model training method.

In one variant (e.g., an example is shown in FIG. 7), the system can acquire images of the ground (1) and get predictions of the localization of the crops and their meristem out of the AI models (2). These predictions can be projected in the 3D space and then tracked to build a 3D plant map of the field (3). From this map, a plan of actuation can be built and sent to the blades controller that can actuate the arms to weed the field (4).

The AI models can be single-shot detectors trained on datasets of images with a custom loss (e.g., enabling the object detection models to be tailored to the specific application; with maximized diversity in the data used to train the models; etc.). In variants, models can be trained with a hybrid supervised sampling method to build and update the datasets (e.g., oversampling hard edge cases thanks with feedback from both operators in the fields and automatic images selection based on model detection).

In variants, the method can operate with the MLops architecture using PyTorch, AWS, Weights & Biases, custom iterative tools, and/or any other suitable avenues. As explained above, models can be trained and tested on different use cases (e.g., namely edge cases, where finding crops among a high density of weeds may be most challenging). The final quality of weeding can be highly correlated to the performance of the AI models, but may not be strictly equivalent (e.g., since all the downstream steps of the pipeline also contribute to this quality: the quality of the tracker, the precision of the actuators, etc.). Optimal implementations can open the blade(s) for each crop (e.g., to avoid killing them) and closed everywhere else (e.g., killed all the weeds).

In variants, the perception method can include a multistep pipeline, which can use Machine Learning (ML) models to detect crops as well as the localization of the meristem; Visual odometry to map plants from the pixel space to the 3d space (e.g., the environment of the machine; which can infer how the camera—and naturally the whole machine-moves from one image to the following one, both in translation and in rotation. In variants, the frame rate can be sufficiently high such that there can be multiple views of the same instances. The tracker can aggregate the predicted localization of the crops and their stem to strengthen the confidence we have in both classification and localization.

In variants, models can be trained to only detect crops (not weeds). Alternatively, the model could be trained to detect both (e.g., multi-class classifier).

5.1 Illustrative Examples

In a first example, the system for crop analysis can include: a housing configured to be coupled with an agricultural implement, the housing defining: a $1^{st}$ broad surface and a $2^{nd}$ broad surface opposing the $1^{st}$ broad surface, a $1^{st}$ cavity defined at least in part by the $1^{st}$ broad surface, and a $2^{nd}$ cavity is defined at least in part by the $2^{nd}$ broad surface; a lighting subsystem arranged in the $2^{nd}$ cavity including a set of light emitting diode (LED) arrays configured to emit light brighter than direct sunlight; a set of optical sensors arranged in the $2^{nd}$ cavity; a thermal management subsystem including: a thermoelectric cooler configured to transfer heat out of the $2^{nd}$ cavity, a set of cylindrical pins extending outward from and perpendicular to the $1^{st}$ broad surface; a shield arranged external to the housing; and/or a set of processing subsystems arranged in the $2^{nd}$ cavity, the set of processing subsystems configured to produce the crop analysis based on imaging data collected by the set of optical sensors, wherein the agricultural implement is controlled based at least in part on the crop analysis.

The system can optionally have, during at least a portion of the crop analysis and processing, the $1^{st}$ cavity associated with a $1^{st}$ temperature and the $2^{nd}$ cavity is associated with a $2^{nd}$ temperature, the $2^{nd}$ temperature separate and distinct from the $1^{st}$ temperature. In examples, the $1^{st}$ temperature is below 80 degrees Celsius and the $2^{nd}$ temperature is below 60 degrees Celsius. The $1^{st}$ temperature can optionally be greater than 60 degrees Celsius.

The system can optionally have at least one of the set of optical sensors configured to repeatedly detect a height of the system relative to a crop bed, wherein the agricultural implement is further controlled based on the detected set of heights.

The thermal management subsystem can optionally be further configured to transfer heat from the $2^{nd}$ cavity to the $1^{st}$ cavity.

The thermal management subsystem can optionally be configured to transfer heat from the $2^{nd}$ cavity to an exterior of the housing.

The agricultural implement can optionally be a weeder and/or a sprayer.

The system can optionally further include a set of urethane dampers, wherein the housing is coupled with the agricultural implement with the set of urethane dampers and a set of mounting pins, the set of mounting pins arranged among and parallel with the set of cylindrical pins.

The housing can optionally be mounted to a single effector of the agricultural implement, wherein the lighting subsystem is configured to illuminate a single row of crops.

The housing can optionally further include a lens covering arranged proximal to the LED arrays, wherein the lens covering is configured to produce the light in a substantially rectangular region. The lens covering can optionally be configured with a rippled surface.

The system can optionally include additional iterations of the system, wherein a housing associated with each additional system is coupled with a different effector of the same agricultural implement, and each system configured to image a different single row.

In a second example, the system for crop analysis, the system can include: a housing defining at least a $1^{st}$ cavity and a $2^{nd}$ cavity, wherein the housing is configured to be mounted to an agricultural implement; a lighting subsystem arranged in the $2^{nd}$ cavity, the lighting subsystem including a set of light emitting diode (LED) arrays configured to emit light brighter than direct sunlight; a set of multiple optical sensors arranged in the $2^{nd}$ cavity and between the set of LED arrays, the set of multiple optical sensors configured to image a set of crops; a thermal management subsystem configured to transfer heat away from the $2^{nd}$ cavity, wherein the thermal management subsystem creates a temperature difference between the $1^{st}$ and $2^{nd}$ cavities; and a set of processing subsystems arranged in the $2^{nd}$ cavity, the set of processing subsystems configured to produce the crop analysis based on imaging data collected by the set of optical sensors, wherein the agricultural implement is controlled at least in part based on the crop analysis.

Each of the set of LED arrays can optionally be angled with a non-zero angle relative to other LED arrays of the set. Additionally or alternatively, each of the set of LED arrays can be angled with a non-zero angle relative to a broad surface of the housing.

The thermal management subsystem can optionally include any or all of: a thermoelectric cooler in the $2^{nd}$ cavity; a set of cylindrical pins extending outward from and perpendicular to the $1^{st}$ broad surface; and/or a shield arranged external to the housing and configured to shield at least a portion of the set of cylindrical pins.

The set of optical sensors can include a set of multiple cameras, the set of multiple cameras optionally including: a $1^{st}$ stereo camera, wherein the $1^{st}$ stereo camera collects the imaging data; and a $2^{nd}$ stereo camera, wherein the $2^{nd}$ stereo detects a height of the system relative to a row of crops, wherein the agricultural implement is further controlled based on the height.

The light emitted by the LED arrays can have an intensity greater than 200,000 lux. Additionally, the intensity can be greater than 300,000 lux.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for crop analysis, the system comprising:
   a housing configured to be coupled with an agricultural implement, the housing defining:
      a $1^{st}$ broad surface and a $2^{nd}$ broad surface opposing the $1^{st}$ broad surface;
      a $1^{st}$ cavity defined at least in part by the $1^{st}$ broad surface; and
      a $2^{nd}$ cavity is defined at least in part by the $2^{nd}$ broad surface;
   a lighting subsystem arranged in the $2^{nd}$ cavity, comprising a set of light emitting diode (LED) arrays configured to emit light brighter than direct sunlight;
   a set of optical sensors arranged in the $2^{nd}$ cavity;
   a thermal management subsystem comprising:
      a thermoelectric cooler configured to transfer heat out of the $2^{nd}$ cavity;
      a set of cylindrical pins extending outward from and perpendicular to the $1^{st}$ broad surface;
      a shield arranged external to the housing;
   a set of processing subsystems arranged in the $2^{nd}$ cavity, the set of processing subsystems configured to produce the crop analysis based on imaging data collected by the set of optical sensors, wherein the agricultural implement is controlled based at least in part on the crop analysis.

2. The system of claim 1, wherein, during at least a portion of the crop analysis and processing, the $1^{st}$ cavity is associated with a $1^{st}$ temperature and the $2^{nd}$ cavity is associated with a $2^{nd}$ temperature, the $2^{nd}$ temperature separate and distinct from the $1^{st}$ temperature.

3. The system of claim 2, wherein the $1^{st}$ temperature is below 80 degrees Celsius and the $2^{nd}$ temperature is below 60 degrees Celsius.

4. The system of claim 3, wherein the $1^{st}$ temperature is greater than 60 degrees Celsius.

5. The system of claim 1, wherein at least one of the set of optical sensors is configured to repeatedly detect a height of the system relative to a crop bed, wherein the agricultural implement is further controlled based on the detected set of heights.

6. The system of claim 1, wherein the thermal management subsystem is further configured to transfer heat from the $2^{nd}$ cavity to the $1^{st}$ cavity.

7. The system of claim 1, wherein the thermal management subsystem is further configured to transfer heat from the $2^{nd}$ cavity to an exterior of the housing.

8. The system of claim 1, wherein the agricultural implement comprises at least one of a weeder or a sprayer.

9. The system of claim 1, further comprising a set of urethane dampers, wherein the housing is coupled with the agricultural implement with the set of urethane dampers and a set of mounting pins, the set of mounting pins arranged among and parallel with the set of cylindrical pins.

10. The system of claim 1, wherein the housing is mounted to a single effector of the agricultural implement, wherein the lighting subsystem is configured to illuminate a single row of crops.

11. The system of claim 10, wherein the housing further comprises a lens covering arranged proximal to the LED arrays, wherein the lens covering is configured to produce the light in a substantially rectangular region.

12. The system of claim 11, wherein the lens covering is configured with a rippled surface.

13. The system of claim 10, further comprising additional iterations of the system, wherein a housing associated with each additional system is coupled with a different effector of the same agricultural implement, and each system configured to image a different single row.

14. A system for crop analysis, the system comprising:
   a housing defining at least a $1^{st}$ cavity and a $2^{nd}$ cavity, wherein the housing is configured to be mounted to an agricultural implement;
   a lighting subsystem arranged in the $2^{nd}$ cavity, the lighting subsystem comprising a set of light emitting diode (LED) arrays configured to emit light brighter than direct sunlight;
   a set of multiple optical sensors arranged in the $2^{nd}$ cavity and between the set of LED arrays, the set of multiple optical sensors configured to image a set of crops;
   a thermal management subsystem configured to transfer heat away from the $2^{nd}$ cavity, wherein the thermal management subsystem creates a temperature difference between the $1^{st}$ and $2^{nd}$ cavities; and
   a set of processing subsystems arranged in the $2^{nd}$ cavity, the set of processing subsystems configured to produce the crop analysis based on imaging data collected by the set of optical sensors, wherein the agricultural implement is controlled at least in part based on the crop analysis.

15. The system of claim 14, wherein each of the set of LED arrays is angled with a non-zero angle relative to other LED arrays of the set.

16. The system of claim 15, wherein each of the set of LED arrays is angled with a non-zero angle relative to a broad surface of the housing.

17. The system of claim 14, wherein the thermal management subsystem comprises:
   a thermoelectric cooler in the $2^{nd}$ cavity;
   a set of cylindrical pins extending outward from and perpendicular to the $1^{st}$ broad surface; and
   a shield arranged external to the housing and configured to shield at least a portion of the set of cylindrical pins.

18. The system of claim 14, wherein the set of optical sensors comprises a set of multiple cameras, the set of multiple cameras comprising:
- a $1^{st}$ stereo camera, wherein the $1^{st}$ stereo camera collects the imaging data; and
- a $2^{nd}$ stereo camera, wherein the $2^{nd}$ stereo detects a height of the system relative to a row of crops, wherein the agricultural implement is further controlled based on the height.

19. The system of claim 14, wherein the light emitted by the LED arrays has an intensity greater than 200,000 lux.

20. The system of claim 19, wherein the intensity is greater than 300,000 lux.

\* \* \* \* \*